US011699416B2

(12) United States Patent
Shiraga et al.

(10) Patent No.: US 11,699,416 B2
(45) Date of Patent: Jul. 11, 2023

(54) INFORMATION PROCESSING DEVICE AND NON-TRANSITORY STORAGE MEDIUM STORING INSTRUCTIONS EXECUTABLE BY THE INFORMATION PROCESSING DEVICE

(71) Applicant: BROTHER KOGYO KABUSHIKI KAISHA, Nagoya (JP)

(72) Inventors: Naoto Shiraga, Nagoya (JP); Yuji Miyata, Kitanagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 13 days.

(21) Appl. No.: 17/358,212

(22) Filed: Jun. 25, 2021

(65) Prior Publication Data

US 2021/0319768 A1 Oct. 14, 2021

Related U.S. Application Data

(63) Continuation of application No. 14/868,550, filed on Sep. 29, 2015, now abandoned.

(30) Foreign Application Priority Data

Sep. 29, 2014 (JP) ................................. 2014-198137
Sep. 29, 2014 (JP) ................................. 2014-198138

(51) Int. Cl.
*G06T 3/60* (2006.01)
*G06F 3/04845* (2022.01)
(Continued)

(52) U.S. Cl.
CPC ........... *G09G 5/38* (2013.01); *G06F 3/04845* (2013.01); *G06T 3/60* (2013.01); *G06T 15/30* (2013.01);
(Continued)

(58) Field of Classification Search
CPC ........ G06T 15/30; G06T 3/60; G06F 3/04845
See application file for complete search history.

(56) References Cited

U.S. PATENT DOCUMENTS 8,081,197 B1 12/2011 Jude et al.
2001/0043400 A1 11/2001 Rivera et al.
(Continued)

FOREIGN PATENT DOCUMENTS

GB 2386789 A 9/2003
JP H08-97973 A 4/1996
(Continued)

OTHER PUBLICATIONS

Japanese Official Action dated Sep. 5, 2018 received in Japanese Patent Application No. JP 2014-198138 together with an English language translation.
(Continued)

*Primary Examiner* — Matthew Salvucci
(74) *Attorney, Agent, or Firm* — Scully, Scott, Murphy & Presser, P.C.

(57) ABSTRACT

A non-transitory storage medium stores instructions executable by an information processing device including an operation device and a display. The instructions cause the information processing device to: display a first image; display a cropping frame for cropping of the first image when the operation device accepts a user operation for displaying the cropping frame in a state in which the first image is displayed; rotate the first image about a center of the cropping frame when the operation device accepts a user operation for rotating the first image in a state in which the first image and the cropping frame are displayed; and rotate the first image about a center of the first image when the operation device accepts a user operation for rotating the
(Continued)

first image in a state in which the first image is displayed, and the cropping frame is not displayed.

24 Claims, 18 Drawing Sheets

(51) Int. Cl.
*G06T 15/30* (2011.01)
*G09G 5/38* (2006.01)

(52) U.S. Cl.
CPC ............... *G09G 2340/0464* (2013.01); *G09G 2340/0492* (2013.01)

(56) References Cited

U.S. PATENT DOCUMENTS

| | | | |
|---|---|---|---|
| 2003/0103234 | A1 | 6/2003 | Takabayashi et al. |
| 2013/0016122 | A1 | 1/2013 | Bhatt et al. |
| 2013/0222313 | A1 | 8/2013 | Nakamura et al. |
| 2013/0236093 | A1 | 9/2013 | Gatt et al. |

FOREIGN PATENT DOCUMENTS

| | | |
|---|---|---|
| JP | H10-240916 A | 9/1998 |
| JP | 2001-111809 A | 4/2001 |
| JP | 2002-008008 A | 1/2002 |
| JP | 2003-032341 A | 1/2003 |
| JP | 2003-323241 A | 11/2003 |
| JP | 2004-072145 A | 3/2004 |
| JP | 2005-012847 A | 1/2005 |
| JP | 2006-229455 A | 8/2006 |
| JP | 2007-328693 A | 12/2007 |
| JP | 2009-060505 A | 3/2009 |
| JP | 2010-232869 A | 10/2010 |
| JP | 2012-070310 A | 4/2012 |

OTHER PUBLICATIONS

Japanese Official Action dated Dec. 11, 2018 received in Japanese Patent Application No. JP 2014-198138 together with an English language translation.
Office Action dated Nov. 28, 2018 received in related U.S. Appl. No. 14/868,550.
Japanese Official Action dated Jun. 5, 2018 received in Japanese Patent Application No. JP 2014-198138 together with an English language translation.
Japanese Official Action dated Feb. 20, 2018 received in Japanese Patent Application No. JP 2014-198137 together with an English language translation.
Office Action dated May 3, 2018 received in related U.S. Appl. No. 14/868,550.
Office Action dated Jan. 17, 2018 received in related U.S. Appl. No. 14/868,550.
Office Action dated Jul. 11, 2017 received in related U.S. Appl. No. 14/868,550.
Notification of Reason for Refusal dated Sep. 10, 2019 received in Japanese Patent Application No. JP 2019-042311 together with an English language translation.
Examiner's Answer dated Jun. 13, 2019 received in related U.S. Appl. No. 14/868,550.
Decision on Appeal dated Apr. 27, 2021 received in related U.S. Appl. No. 14/868,550.
Notice of Reasons for Refusal dated May 23, 2022 received in Japanese Patent Application No. JP 2021-129606.

INFORMATION PROCESSING DEVICE AND NON-TRANSITORY STORAGE MEDIUM STORING INSTRUCTIONS EXECUTABLE BY THE INFORMATION PROCESSING DEVICE

CROSS REFERENCE TO RELATED APPLICATION

This present application is a continuation application of U.S. patent application Ser. No. 14/868,550 filed on Sep. 29, 2015 and claims priority from Japanese Patent Application Nos. 2014-198137 filed on Sep. 29, 2014 and 2014-198138 filed on Sep. 29, 2014, the disclosures of which are herein incorporated by reference in its entirety.

BACKGROUND

Technical Field

The following disclosure relates to an information processing device and a non-transitory storage medium storing a plurality of instructions executable by a processor of the information processing device for displaying an image based on image data.

Description of the Related Art

Some information processing devices display an image on a display device based on image data. Such information processing devices include one capable of cropping the image displayed on the display device at a particular position with a particular size and rotating the cropped image or the original image by a desired angle.

When the image is displayed on the display device based on the image data, the image may be displayed on the display device with tilt by 90 or 180 degrees with respect to a normal position. That is, the image may be displayed on the display device in a sideways position or in a vertically flipped position. There is known a technique for displaying the image in the normal position by rotating the image displayed in the sideways position or in the vertically flipped position, by 90 or 180 degrees.

SUMMARY

In the above-described technique, the cropped image or the original image can be rotated by a desired angle. However, since a method of rotating the cropped image and that of rotating the original image are the same as each other in most cases, the image cannot be rotated as desired in some case. Specifically, for example, in the case where the original image is rotated about its center, the cropped image is also rotated about the center of the original image. In such a case, the cropped image revolves, that is, the cropped image is rotated about an axis outside the cropped image and may not be rotated in a way as a user has expected.

Also, in the above-described technique, the image in the sideways position or in the vertically flipped position can be displayed in the normal position. However, the user may want to slightly rotate the image displayed on the display device. For example, in the case where a document placed on a flat bed of a scanner is tilted slightly, an image based on scan data created based on the document is displayed on the display device with slight tilt with respect to the normal position. In such a case, the image displayed on the display device needs to be rotated by a small angle.

Accordingly, an aspect of the disclosure relates to an information processing device configured to rotate cropped image in a way as a user has expected and relates to a non-transitory storage medium storing a plurality of instructions executable by a processor of the information processing device. Another aspect of the disclosure relates to an information processing device configured to rotate an image displayed in a sideways position to a normal position and rotate an image displayed with slight tilt to the normal position, and relates to a non-transitory storage medium storing a plurality of instructions executable by a processor of the information processing device.

In one aspect of the disclosure, a non-transitory storage medium stores a plurality of instructions executable by a processor of an information processing device. The information processing device includes: an operation device configured to accept a user operation; and a display. The plurality of instructions, when executed by the processor, cause the information processing device to perform: displaying a first image on the display based on image data in a first display process; displaying a cropping frame on the display, in a second display process, when the operation device accepts the user operation for displaying the cropping frame in a state in which the first image is displayed on the display by the first display process, the cropping frame being for cropping of the first image; rotating the first image about a center of the cropping frame, in a first image rotation process, when the operation device accepts the user operation for rotating the first image in a state in which the first image is displayed on the display in the first display process, and the cropping frame is displayed on the display by the second display process; and rotating the first image about a center of the first image, in a second image rotation process, when the operation device accepts the user operation for rotating the first image in a state in which the first image is displayed on the display in the first display process, and the cropping frame is not displayed on the display by the second display process.

In another aspect of the disclosure, an information processing device includes: an operation device configured to accept a user operation; a display; and a controller configured to execute: displaying a first image on the display based on image data in a first display process; displaying a cropping frame on the display, in a second display process, when the operation device accepts the user operation for displaying the cropping frame in a state in which the first image is displayed on the display by the first display process, the cropping frame being for cropping of the first image; rotating the first image about a center of the cropping frame, in a first image rotation process, when the operation device accepts the user operation for rotating the first image in a state in which the first image is displayed on the display by the first display process, and the cropping frame is displayed on the display by the second display process; and rotating the first image about a center of the first image, in a second image rotation process, when the operation device accepts the user operation for rotating the first image in a state in which the first image is displayed on the display by the first display process, and the cropping frame is not displayed on the display by the second display process.

In another aspect of the disclosure, a non-transitory storage medium stores a plurality of instructions executable by a processor of an information processing device. The information processing device includes: an operation device configured to accept a user operation; and a display. The plurality of instructions, when executed by the processor, cause the information processing device to perform: displaying (i) a first image based on image data, (ii) a first operation element, and (iii) a second operation element different from the first operation element, on the display in a display process; rotating the first image displayed on the display by the display process, by a first angle in a first-angle rotation process when the operation device accepts the user operation for the first operation element; and rotating the first image displayed on the display by the display process, by a second angle less than the first angle, in a second-angle rotation process, when the operation device accepts the user operation for the second operation element.

In another aspect of the disclosure, an information processing device includes: an operation device configured to accept a user operation; a display; and a controller configured to execute: displaying a first image based on image data, a first operation element, and a second operation element different from the first operation element, on the display in a display process; rotating the first image displayed on the display by the display process, by a first angle in a first-angle rotation process when the operation device accepts the user operation for the first operation element; and rotating the first image displayed on the display by the display process, by a second angle less than the first angle in a second-angle rotation process when the operation device accepts the user operation for the second operation element.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which.

DETAILED DESCRIPTION OF THE EMBODIMENTS

First Embodiment

Figure 1:
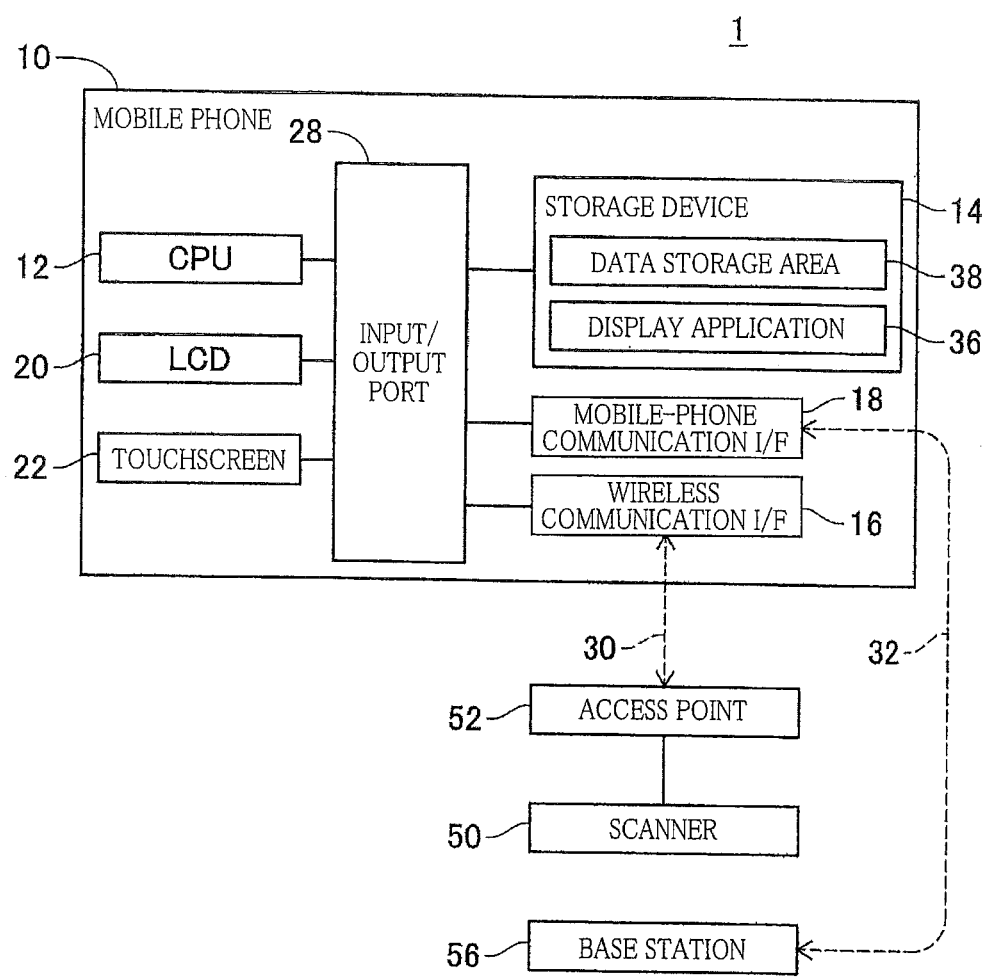
FIG. 1 is a block diagram illustrating a communication system.

FIG. 1 illustrates a communication system 1 according to a first embodiment. The communication system 1 includes a mobile phone 10 (as one example of an information processing device), a scanner 50, an access point 52, and a base station 56. The scanner 50 includes a flat bed and an automatic document feeder (ADF) and scans a document placed on any of the flat bed and the ADF to create scan data. The access point 52 functions as a wireless-LAN access point and a router and is connected to the scanner 50.

There will be next explained a configuration of a mobile phone 10. The mobile phone 10 includes a central processing unit (CPU) 12 as one example of a computer and a controller, a storage device 14, a wireless communication interface 16, a mobile-phone communication Interface 18, a liquid crystal display (LCD) 20 as one example of a display, and a touchscreen 22 as one example of an operation device. These devices are communicable with each other via an input/output port 28.

The wireless communication interface 16 can perform wireless communication 30 using Wi-Fi® (registered trademark of Wi-Fi Alliance) according to IEEE 802.11 standard or any standard equivalent thereto. That is, when the mobile phone 10 is allowed to perform the Wi-Fi wireless communication 30 by accessing the access point 52, the mobile phone 10 can transfer data with the scanner 50 via the access point 52.

The mobile-phone communication Interface 18 can perform wireless communication 32 with the base station 56 according to mobile telecommunication standards. That is, when the mobile phone 10 is allowed to perform the wireless communication 32 according to mobile telecommunication standards, the mobile phone 10 can transfer data via the base station 56.

The CPU 12 executes processings according to a display application 36 (as one example of the control program) stored in the storage device 14. The display application 36 is a program for displaying an image on the LCD 20 based on scan data. Hereinafter, the CPU 12 that executes the display application 36 may be simply referred to as the name of the program. For example, the wording "the display application 36 executes" may mean "the CPU 12 that executes the display application 36 executes".

The storage device 14 has a data storage area 38. The data storage area 38 stores scan data acquired from the scanner 50, and data required for execution of the display application 36, for example. It is noted that the storage device 14 is constituted by a combination of a random access memory (RAM), a read only memory (ROM), a flash memory, a hard disk (HDD), a buffer provided for the CPU 12, and other similar devices.

The LCD 20 has a display surface for displaying various kinds of functions of the mobile phone 10. The touchscreen 22 has a touch sensor and is superposed on the display surface of the LCD 20. The touchscreen 22 detects an approach or a contact of an input object to or with the touchscreen 22 and outputs an electric signal in response to the detection. Examples of the input object include a finger of a user and a stylus.

Displaying of Image Using Communication System

In the communication system 1, the scanner 50 executes a scan processing in response to an instruction received from the mobile phone 10 and then sends the mobile phone 10 scan data created in the scan processing. The mobile phone 10 displays an image on the LCD 20 based on the received scan data. The user operates the touchscreen 22 to rotate the image displayed on the LCD 20 and adjust an angle of the image displayed on the LCD 20.

Specifically, when the user operates the mobile phone 10 so as to touch or approach a button, not shown, for instructing execution of a processing for displaying the image based on the scan data, the LCD 20 displays a screen, not shown, for execution of the scan processing. This screen contains setting buttons, not shown, and a scan button, not shown. The setting buttons are for setting of conditions of the scan processing. The user operates the setting buttons to set a resolution, select one of black/white scanning and color scanning, and select one of the flat bed of the scanner 50 and the ADF to scan a document thereon, for example. The scan button is for instructing execution of the scan processing. When the user operates the scan button, an instruction for execution of the scan processing under the set scan processing conditions is transmitted to the scanner 50.

Figure 2:
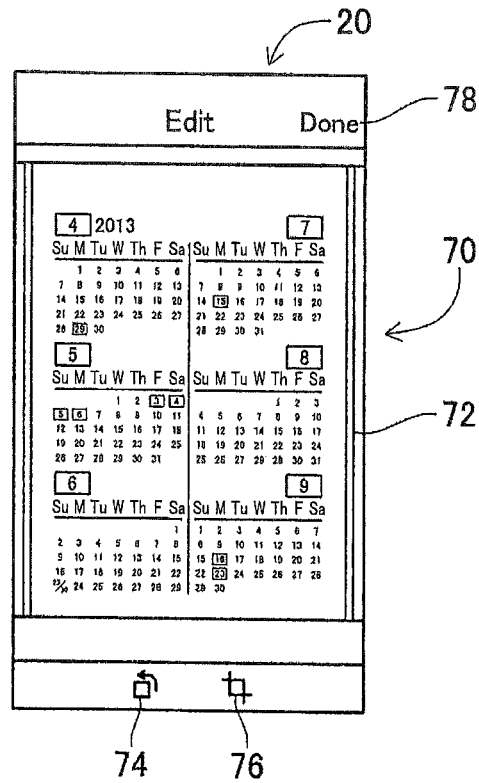
FIG. 2 is a view illustrating an edit screen.

In response to receiving the instruction for execution of the scan processing, the scanner 50 executes the scan processing according to the instruction and sends the mobile phone 10 scan data created in the scan processing. In response to receiving the scan data, the mobile phone 10, as illustrated in FIG. 2, displays an edit screen 70 on the LCD 20. The edit screen 70 contains a display area 72, a rotation button 74, a cropping button 76, and a Done button 78. An image based on the received scan data is displayed on the display area 72. The rotation button 74 is for instructing execution of a rotation processing for rotating the image displayed on the display area 72. The cropping button 76 is for instructing execution of a cropping processing for cropping (trimming) the image displayed on the display area 72. The Done button 78 is operated when operations on the edit screen 70 are finished.

Figure 3:
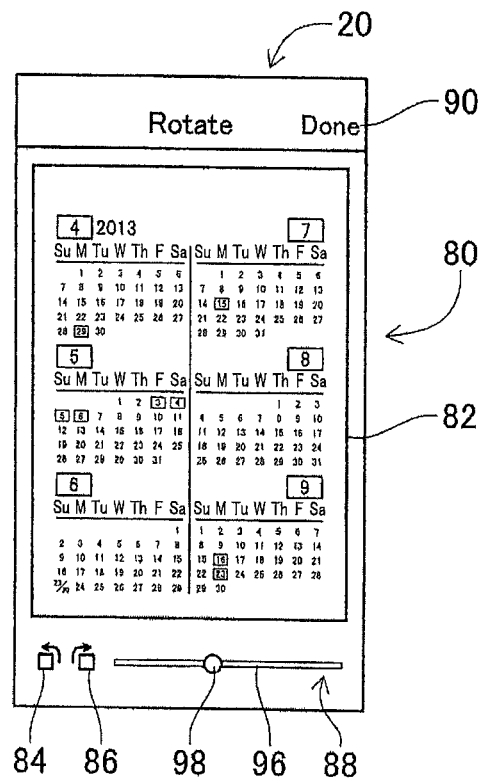
FIG. 3 is a view illustrating a rotation processing screen.

When the rotation button 74 is operated on the edit screen 70, as illustrated in FIG. 3, a rotation processing screen 80 is displayed on the LCD 20. The rotation processing screen 80 contains a display area 82, a left rotation button 84 as one example of a first operation element, a right rotation button 86 as one another of the first operation element, an angle adjuster 88 as one example of a second operation element, and a Done button 90. The image displayed on the display area 72 of the edit screen 70 is displayed on the display area 82. The left rotation button 84 is for rotating the image displayed on the display area 82 in a left direction by 90 degrees. The right rotation button 86 is for rotating the image displayed on the display area 82 in a right direction by 90 degrees. The angle adjuster 88 is for rotating the image displayed on the display area 82 in a desired direction by a desired angle. The Done button 90 is operated when operations on the rotation processing screen 80 are finished. When one of the buttons is operated by the user, the touchscreen 22 outputs a signal relating to the operation. Also, when a slider 98 of the angle adjuster 88 is operated, the touchscreen 22 outputs a signal relating to the operation.

Figure 4:
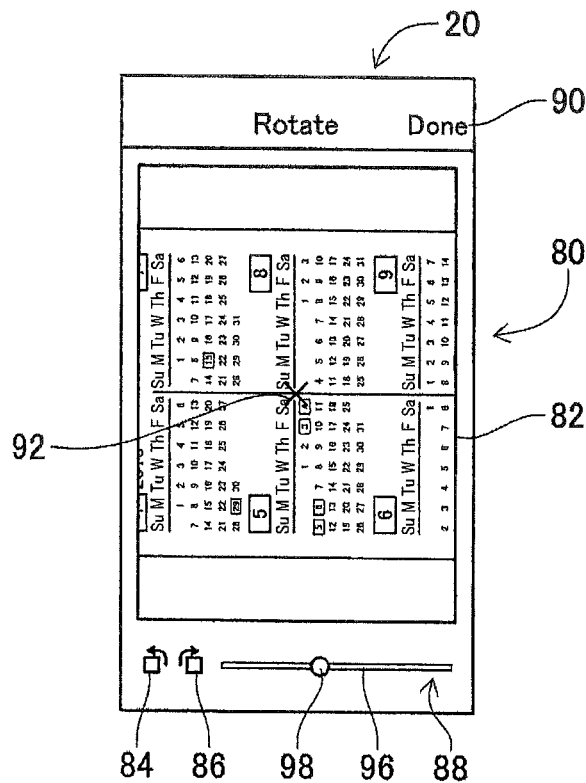
FIG. 4 is a view illustrating the rotation processing screen.

When the left rotation button 84 is operated on the rotation processing screen 80, as illustrated in FIG. 4, the image displayed on the display area 82 is rotated in the left direction by 90 degrees. When the right rotation button 86 is operated, the image displayed on the display area 82 is rotated in the right direction by 90 degrees. With these processings, for example, an image created based on the document which is tilted by 90 degrees during scanning, i.e., an image in a sideways position can be displayed on the LCD 20 as an image in a normal state (position). Also, when the left rotation button 84 is operated twice, the image displayed on the display area 82 is rotated in the left direction by 180 degrees. When the right rotation button 86 is operated twice, the image displayed on the display area 82 is rotated in the right direction by 180 degrees. With these processings, for example, an image created based on the document which is tilted by 180 degrees during scanning, i.e., an image flipped in an up and down direction can be displayed on the image in the normal state. It is noted that when the image displayed on the display area 82 is rotated, the image is rotated about a center 92 of the image. The center 92 of the image is spaced equally from vertices of respective four corners of the generally rectangular image, for example. A mark indicating the center 92 is illustrated in the figures for explanation and is not displayed on the actual rotation processing screen 80.

The angle adjuster 88 includes a guide 96 and the slider 98. The guide 96 is a straight line having a predetermined length and displayed on the LCD 20 so as to extend in the right and left direction of the mobile phone 10. The slider 98 is shaped generally like a circle and displayed at a center of the slider 98. The slider 98 is slidable on the guide 96 in a direction along the guide 96. That is, the slider 98 is slid on the guide 96 when the user moves the input object in the right and left direction in a state in which the input object is on or near the slider 98. When the slider 98 is slid in this manner, the image displayed on the display area 82 is rotated in a direction of the sliding of the slider 98 by an angle corresponding to an amount of the sliding of the slider 98.

Figure 5:
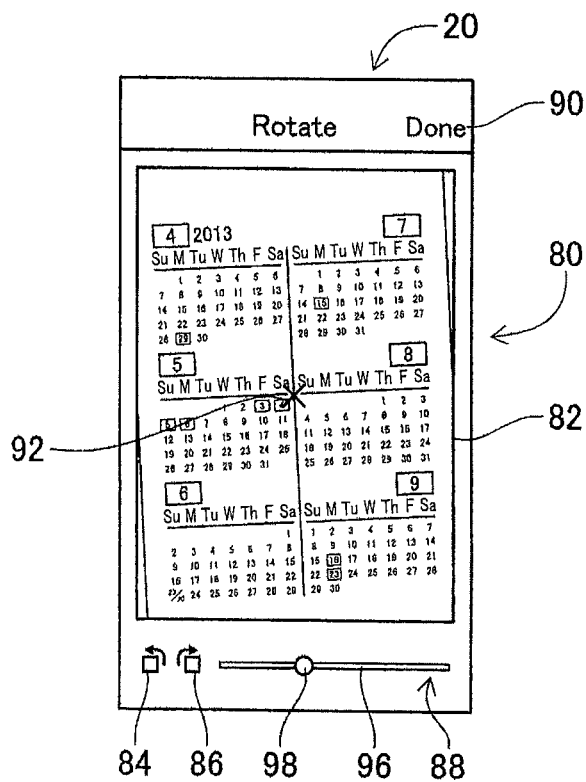
FIG. 5 is a view illustrating the rotation processing screen.

Specifically, for example, when the slider 98 is, as illustrated in FIG. 5, slid in the left direction by a certain amount, the image displayed on the display area 82 is rotated in the left direction by the angle corresponding to the amount of the sliding of the slider 98. When the slider 98 is slid in the right direction by a certain amount, the image displayed on the display area 82 is rotated in the right direction by the angle corresponding to the amount of the sliding of the slider 98. It is noted that when the image displayed on the display area 82 is rotated, the image is rotated about its center 92.

When the slider 98 is slid to a left end or a right end of the guide 96, the image displayed on the display area 82 is rotated by the largest angle. This angle of rotation of the image, i.e., the maximum rotation angle by which an image is rotated by the operation for the slider 98 is set at a particular angle less than or equal to the rotation angle by which the image is rotated in response to the operation on the left rotation button 84 or the right rotation button 86, i.e., 90 degrees. That is, by operating the angle adjuster 88 to adjust an amount of sliding of the slider 98, the user can adjust an angle of the image displayed on the display area 82 to any angle equal to or less than the particular angle which is equal to or less than 90 degrees. In the case where a document placed in a slightly slanting position on the flat bed of the scanner 50 or the ADF is scanned, for example, a slightly slanting image is displayed on the display area 72 of the edit screen 70. However, by operating the angle adjuster 88 on the rotation processing screen 80, the user can slightly adjust the angle of tilt of the displayed image to display the image in the normal state on the display area 82.

The smaller the maximum rotation angle by which an image is rotated by the operation for the slider 98 (hereinafter referred to as "image maximum rotation angle") is set, the better the angle of tilt of the displayed image can be adjusted. However, if the image maximum rotation angle is too small, an image displayed with tilt by an angle greater than the image maximum rotation angle cannot be rotated to a normal state. In particular, in the case where the document is placed on the flat bed, the document is placed in a slanting position with a higher possibility than in the case where the document is placed on the ADF. Thus, in the case where an image based on scan data created based on the document placed on the flat bed is displayed in a slanting position, the tilted image cannot be rotated to its normal state if the image maximum rotation angle is too small.

In view of the above, the image maximum rotation angle for the image displayed on the LCD 20 based on the scan data created based on the document placed on the flat bed is set to be greater than the image maximum rotation angle for the image displayed on the LCD 20 based on the scan data created based on the document placed on the ADF. Specifically, the scan processing conditions set by the user using the setting buttons on the screen for execution of the scan processing are stored in the data storage area 38. When the image is displayed on the LCD 20 based on the scan data, scan processing conditions relating to the scan data are extracted from the data storage area 38. It is then determined, based on the extracted scan processing conditions, whether the document to be scanned is placed on the flat bed or the ADF. When it is determined that the document to be scanned is placed on the flat bed, the image maximum rotation angle is set to 15 degrees. When it is determined that the document to be scanned is placed on the ADF, the image maximum rotation angle is set to 10 degrees. That is, the image maximum rotation angle is set to a relatively small angle of any of 10 to 15 degrees, and in the case where there is a high possibility that an image tilted greatly is displayed, the image maximum rotation angle is set to a relatively large angle. With these processings, the user can better adjust the angle of tilt of the displayed image, and rotate the tilted displayed image to its normal state even in the case where the document is placed on the flat bed with great tilt.

Figure 6:
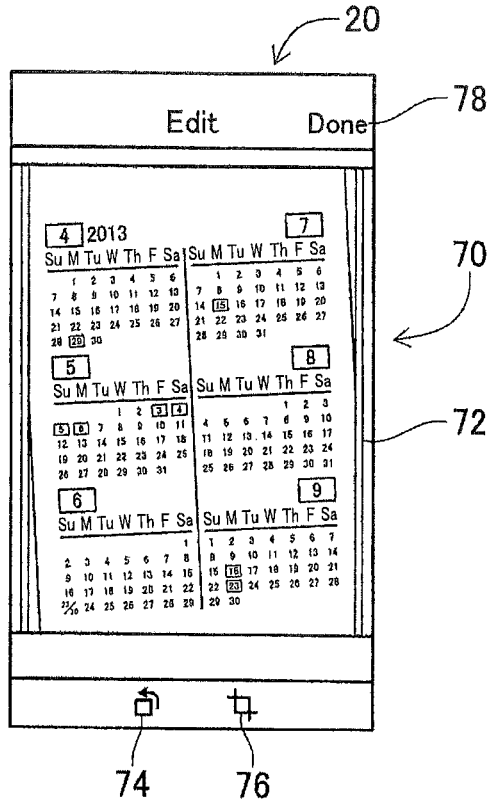
FIG. 6 is a view illustrating the edit screen.

When the Done button 90 is operated on the rotation processing screen 80, as illustrated in FIG. 6, the edit screen 70 is displayed on the LCD 20. The image displayed on the display area 82 of the rotation processing screen 80 is displayed on the display area 72 of the edit screen 70. That is, in the case where the image rotation processing is executed on the rotation processing screen 80, the image rotated in the rotation processing is displayed on the display area 82 of the rotation processing screen 80.

Figure 7:
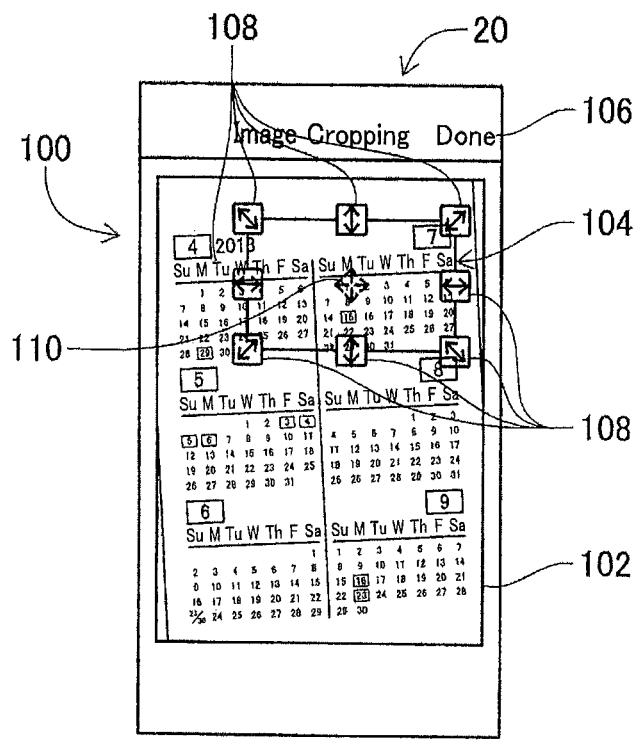
FIG. 7 is a view illustrating a cropping processing screen.

When the cropping button 76 is operated on the edit screen 70, as illustrated in FIG. 7, the LCD 20 displays a cropping processing screen 100. The cropping processing screen 100 contains a display area 102, a cropping frame (marquee) 104, and a Done button 106. On the display area 102, the image displayed on the display area 72 of the edit screen 70 is displayed, and the cropping frame 104 is displayed on the image. It is noted that the image is displayed such that a portion of the image which is located inside the cropping frame 104 (which may be hereinafter referred to as "image inside the cropping frame 104") is brighter than a portion of the image which is located outside the cropping frame 104 (which may be hereinafter referred to as "image outside the cropping frame 104").

The cropping frame 104 is used for cropping out a desired portion of the image displayed on the display area 102. Scaling elements 108 are provided on respective vertices and sides of the cropping frame 104. Each of the scaling elements 108 contains a double-headed arrow. When the user slides one of the scaling elements 108 in a direction indicated by the arrow, the size of the cropping frame 104 is increased or reduced in the direction indicated by the arrow. That is, the cropping frame 104 is enlarged or reduced in the direction indicated by the arrow when the user moves the input object in the direction indicated by the arrow depicted on the scaling element 108 in the state in which the input object is on or near the scaling element 108. This processing can resize the cropping frame 104 to a desired size. A moving element 110 is provided on a central portion of the cropping frame 104. The moving element 110 is for movement of the cropping frame 104. When the user moves the input object to a desired position in the state in which the input object is on or near the moving element 110, the cropping frame 104 is moved to the position. This processing can move the cropping frame 104 to a desired position on the image displayed on the display area 102.

Figure 8:
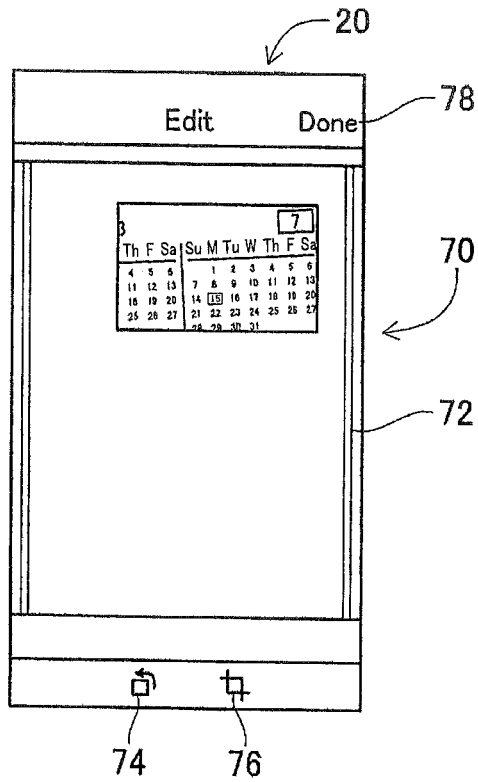
FIG. 8 is a view illustrating the edit screen.

After the cropping frame 104 is resized to a desired size and moved to a desired position on the cropping processing screen 100, when the Done button 106 is operated, as illustrated in FIG. 8, the LCD 20 displays the edit screen 70. On the display area 72 of the edit screen 70 is displayed only a portion of the image displayed on the display area 102 of the cropping processing screen 100, which portion is located inside the cropping frame 104 (noted that this portion may be hereinafter referred to as "cropped image"). With this processing, only the user-desired portion of the image displayed on the display area 102 can be displayed on the LCD 20.

Figure 9:
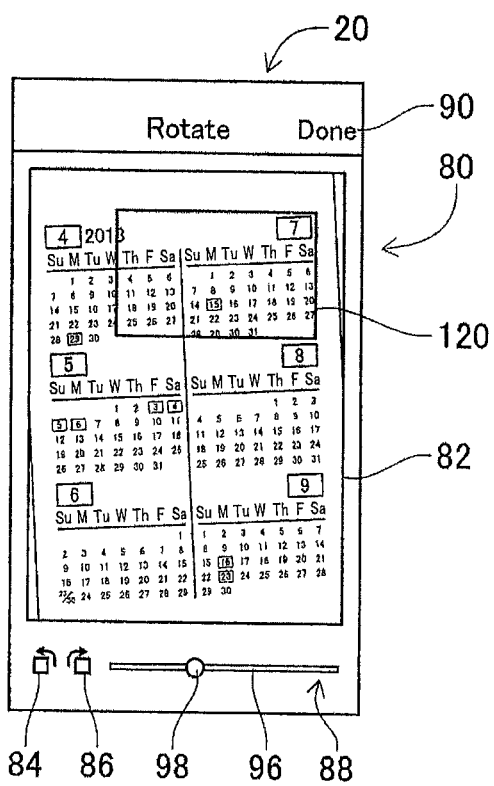
FIG. 9 is a view illustrating the rotation processing screen.

On the mobile phone 10, an angle of rotation of the cropped image can be adjusted. That is, when the rotation button 74 is operated in a state in which the cropped image is displayed on the display area 72 of the edit screen 70, as illustrated in FIG. 9, the LCD 20 displays the rotation processing screen 80. Not only the cropped image but also the image outside the cropped image (the cropping frame 104) is displayed on the display area 82 of the rotation processing screen 80. That is, the image displayed on the display area 102 of the cropping processing screen 100 is displayed on the display area 82. The cropped image is brighter than the image outside the cropping frame 104. Thus, a cropping frame 120 is displayed between the cropped image and the image outside the cropped image.

Figure 10:
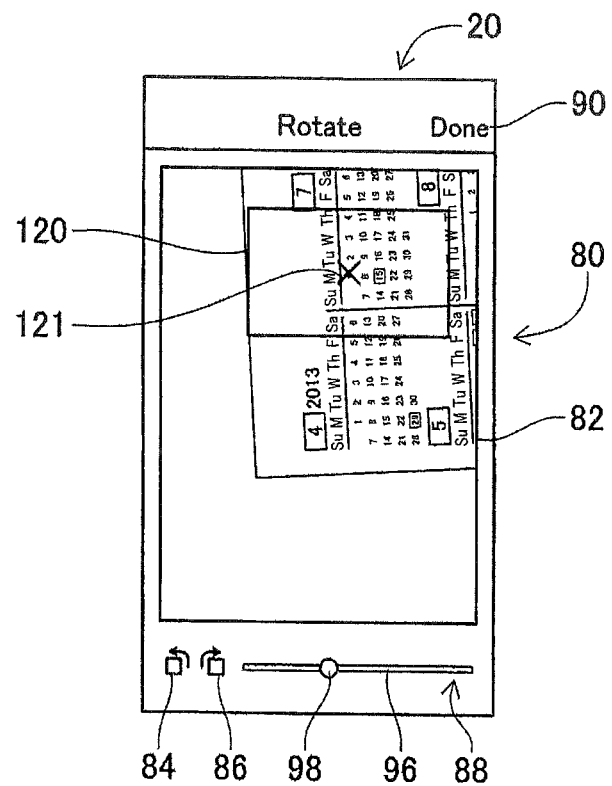
FIG. 10 is a view illustrating the rotation processing screen.

When the left rotation button 84 is operated in the state in which the cropping frame 120 is displayed on the display area 82 of the rotation processing screen 80, as illustrated in FIG. 10, the image displayed on the display area 82 is rotated in the left direction by 90 degrees. In the case where the processing for rotating the image is executed in the state in which the cropping frame 120 is displayed on the display area 82, the image displayed on the display area 82 is rotated not about the center 92 of the image but about a center 121 of the cropping frame 120 for the following reason. In the case where the center 121 of the cropping frame 120 does not coincide with the center 92 of the image, when the image is rotated about its center 92 with the cropping frame 120 being displayed on the display area 82, the cropped image revolves, that is, the cropped image is rotated about an axis located outside the cropping frame 120, which inhibits the cropped image from being rotated in a way as the user has expected. On this mobile phone 10, in contrast, the image is rotated about the center 121 of the cropping frame 120 with the cropping frame 120 being displayed on the display area 82, that is, the cropped image is rotated about an axis located inside the cropping frame 120, enabling the cropped image to be rotated in the way as the user has expected. It is noted that the center 121 of the cropping frame 120 is spaced equally from vertices of respective four corners of the generally rectangular cropping frame 120, for example. A mark indicating the center 121 of the cropping frame 120 is illustrated in the figures for explanation and is not displayed on the actual rotation processing screen 80.

Figure 11:
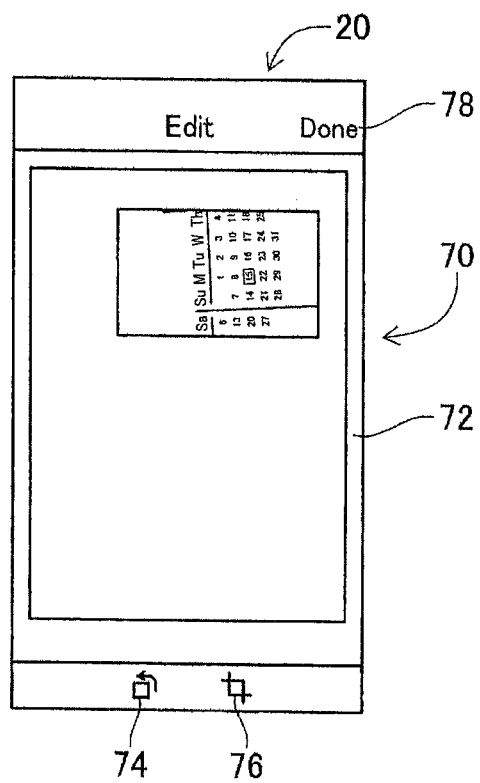
FIG. 11 is a view illustrating the edit screen.

After the processing for rotating the image is executed in the state in which the cropping frame 120 is displayed on the display area 82, when the Done button 90 is operated, as illustrated in FIG. 11, only the image inside the cropping frame 120 is displayed on the display area 82 as the cropped image. It is noted that when the right rotation button 86 is operated in the state in which the cropping frame 120 is displayed on the display area 82 of the rotation processing screen 80, the same processing is executed as in the case where the left rotation button 84 is operated, except for the image being rotated in the right direction, and an explanation thereof is dispensed with.

Figure 12:
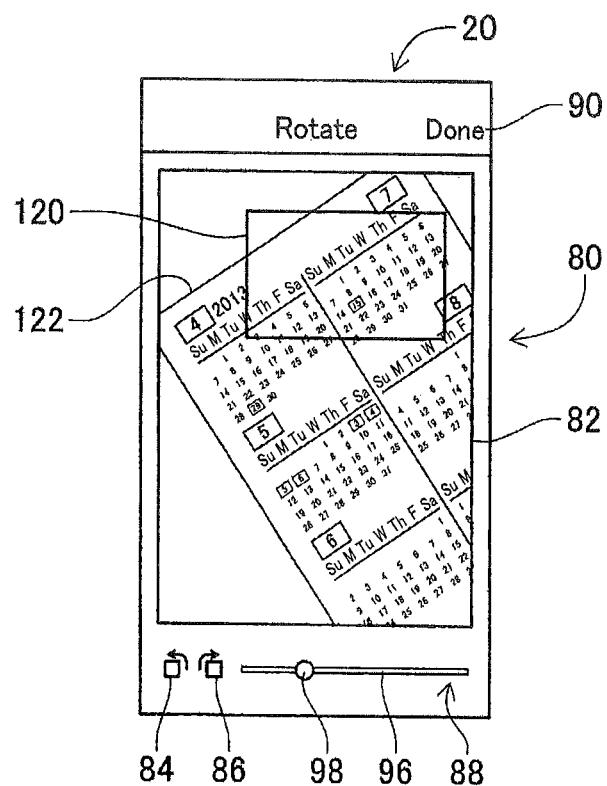
FIG. 12 is a view illustrating the rotation processing screen.

When the slider 98 of the angle adjuster 88 is slid by the user in the state in which the cropping frame 120 is displayed on the display area 82 of the rotation processing screen 80, the image displayed on the display area 82 is rotated in the direction of the sliding of the slider 98 by the angle corresponding to the amount of the sliding of the slider 98. Specifically, as illustrated in FIG. 12, in the case where the slider 98 is slid by the user in the left direction by a certain amount, for example, the image displayed on the display area 82 is rotated in the left direction by the angle corresponding to the amount of the sliding of the slider 98. In this rotation, as in the case where the left rotation button 84 is operated, the image displayed on the display area 82 is rotated not about the center 92 of the image but about the center 121 of the cropping frame 120. This processing can rotate the cropped image in the way as the user has expected.

Figure 13:
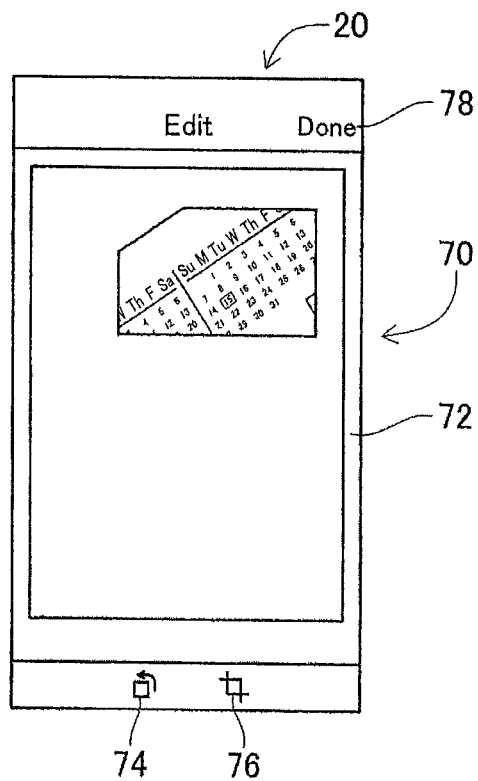
FIG. 13 is a view illustrating the edit screen.

After the rotation of the image, when the Done button 90 is operated, only the image inside the cropping frame 120 is displayed as the cropped image, and a portion of the cropping frame 120 in some cases lies off the image due to the rotation of the image displayed on the display area 82. That is, the entire inside area of the cropping frame 120 may not be filled with the image. Specifically, on the display area in FIG. 12, an upper edge 122 of the image displayed on the display area 82 is partly located within the cropping frame 120, and an upper left corner portion of the cropping frame 120 lies off the image displayed on the display area 82. That is, the upper left corner portion of the cropping frame 120 is not filled with the image displayed on the display area 82. When the image is cropped in the state in which the entire inside area of the cropping frame 120 is not filled with the image, as illustrated in FIG. 13, the cropped image is displayed in a state in which a portion of the inside of the cropping frame 120 which is not filled with the image, i.e., a portion of the cropping frame 120 which lies off the image is cut out.

Figure 14:
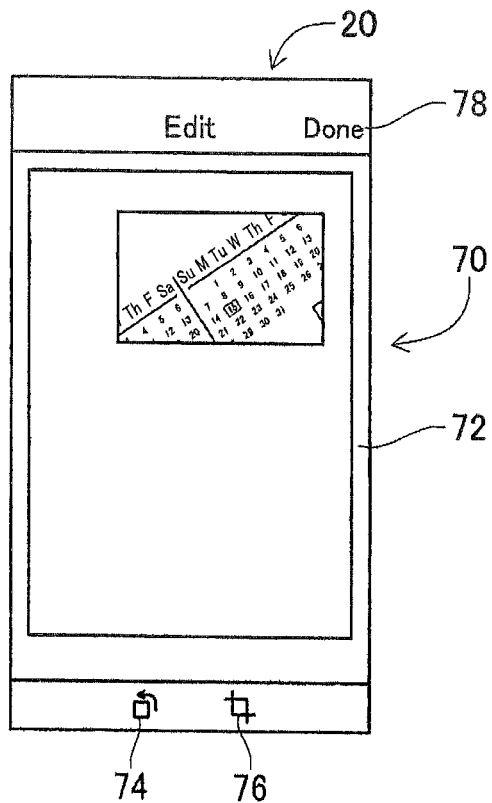
FIG. 14 is a view illustrating the edit screen.

In the case where the entire inside area of the cropping frame 120 is not filled with the image displayed on the display area 82, image data indicating the cropped image is corrected in the mobile phone 10 so as to add a particular image to the portion of the inside of the cropping frame 120 which is not filled with the image, i.e., the portion of the cropping frame 120 which lies off the image. Thus, when the Done button 90 is operated after the operation for rotating the image, as illustrated in FIG. 14, a cropped image corresponding to the shape of the cropping frame 120 is displayed on the display area 72. It is noted that the particular image may be a predetermined image such as a white image or a black image and may be an image of a particular color in the cropped image.

When the slider 98 is slid in the right direction by a certain amount in the state in which the cropping frame 120 is displayed on the display area 82, the same processing is executed as in the case where the slider 98 is slid in the left direction by a certain amount, except for the image displayed on the display area 82 being rotated in the right direction, and an explanation thereof is dispensed with. It is noted that the maximum rotation angle by which the cropped image is rotated by the operation for the slider 98 is set at an angle equal to the image maximum rotation angle, and like the image maximum rotation angle, the maximum rotation angle for the cropped image varies depending upon a position of a placed document on the flat bed or the ADF, based on which the displayed image is created.

When the cropped image is rotated, not only the image inside the cropping frame 120, i.e., the cropped image, but also the image outside the cropping frame 120 is displayed. This processing allows the user to rotate the cropped image while viewing the entire image, thereby appropriately rotating the cropped image.

Figure 15:
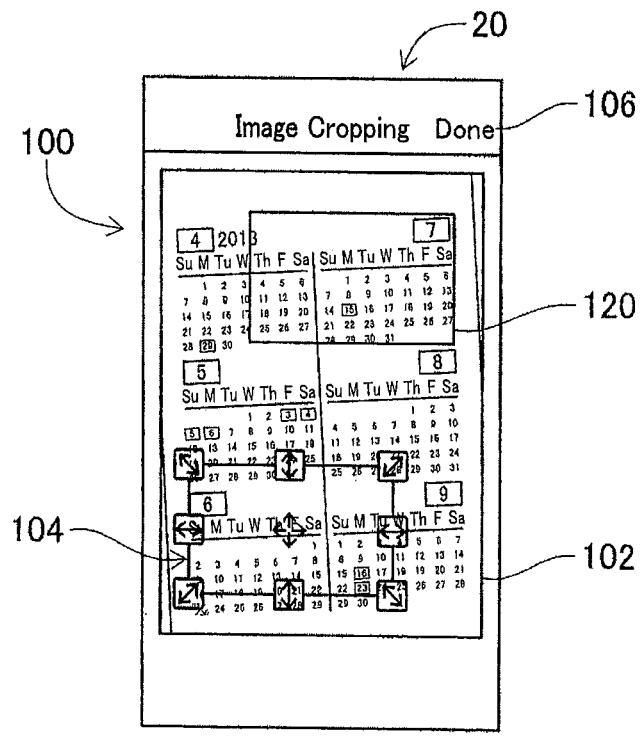
FIG. 15 is a view illustrating the cropping processing screen.
Figure 16:
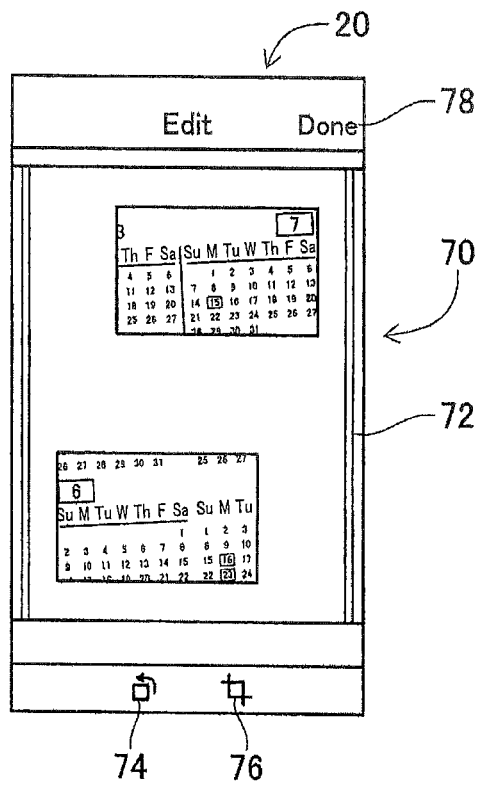
FIG. 16 is a view illustrating the edit screen.

On this mobile phone 10, a plurality of cropped images can be cut out of the displayed image. Specifically, for example, when the cropping button 76 is operated in the state in which the cropped image is, as illustrated in FIG. 8, displayed on the display area 72 of the edit screen 70, the LCD 20 displays the cropping processing screen 100 as illustrated in FIG. 15. The cropping processing screen 100 contains: the cropping frame 120 positioned and scaled corresponding to the cropped image displayed on the edit screen 70; and the cropping frame 104 for additionally cropping the image. As described above, the cropping frame 104 can be moved to a desired position and resized to a desired size by the user operation performed for the scaling elements 108 and the moving element 110. After the cropping frame 104 is moved to a desired position and resized to a desired size, when the Done button 106 is operated on the cropping processing screen 100, as illustrated in FIG. 16, the LCD 20 displays the edit screen 70 containing two cropped images on the display area 72.

Figure 17:
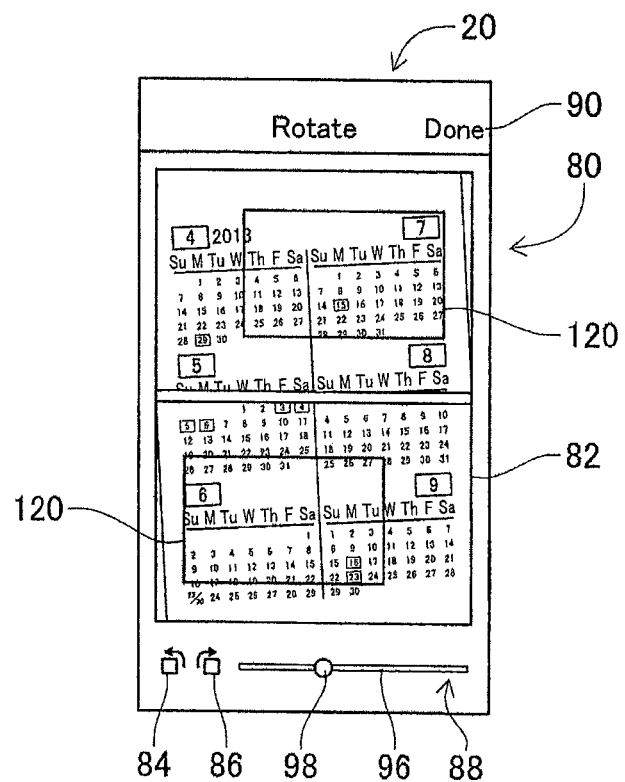
FIG. 17 is a view illustrating the rotation processing screen.

On this mobile phone 10, the plurality of cropped images can be rotated individually. Specifically, for example, when the rotation button 74 is operated in a state in which the two cropped images are displayed on the display area 72 of the edit screen 70, as illustrated in FIG. 17, the LCD 20 displays the rotation processing screen 80. On the display area 82 of the rotation processing screen 80 are displayed two cropping frames 120 which are positioned and scaled corresponding to the respective two cropped images displayed on the edit screen 70. Not only the two cropped images but also the image outside the cropped images is displayed on the display area 82. It is noted that the image displayed on the display area 82 is divided into two images containing the respective cropping frames 120. That is, in the case where the plurality of cropping frames 120 are displayed on the display area 82, the image displayed on the display area 82 is divided into a plurality of partial images which are equal in number to the cropping frames 120, and each of the partial images contains one cropping frame 120.

Figure 18:
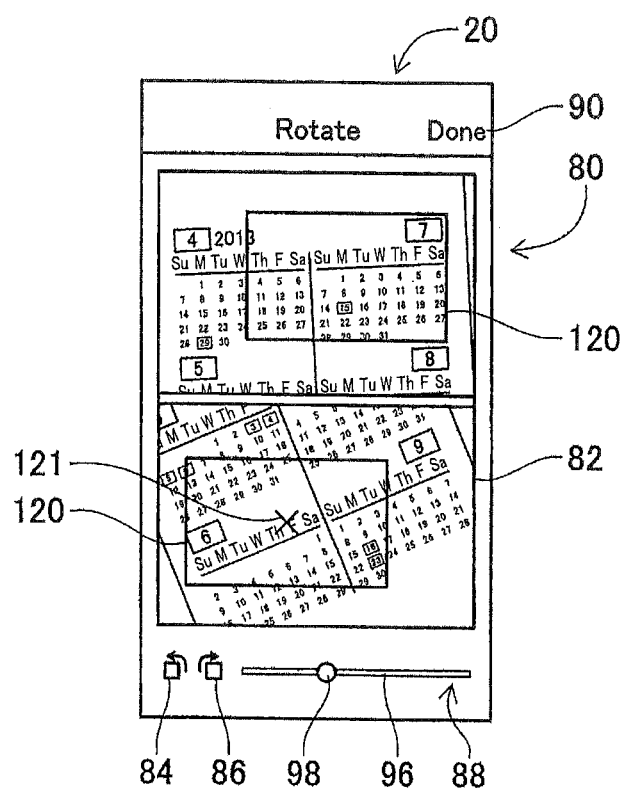
FIG. 18 is a view illustrating the rotation processing screen.

When the user selects one of the partial images on the display area 82 and operates one of the left rotation button 84, the right rotation button 86, and the angle adjuster 88, one of the cropped images which is contained in the selected partial image is rotated. Specifically, for example, in the case where the user wants to select a lower one of the two partial images displayed on the display area 82 in FIG. 17, when the user moves the input object to or toward the partial image, the partial image is selected. When the user then slides the slider 98 of the angle adjuster 88, as illustrated in FIG. 18, the selected partial image is rotated in a direction of the sliding of the slider 98 by an angle corresponding to an amount of the sliding. In this rotation, the selected partial image is rotated about the center 121 of the cropping frame 120 displayed on the selected partial image. It is noted that the partial image not selected is not rotated. In the case where the left rotation button 84 or the right rotation button 86 is operated after the user selects a desired one of the partial images displayed on the display area 82, the selected partial image is rotated by 90 degrees in the right or left direction about the center 121 of the cropping frame 120 displayed on the partial image, and the partial image not selected is not rotated.

Figure 19:
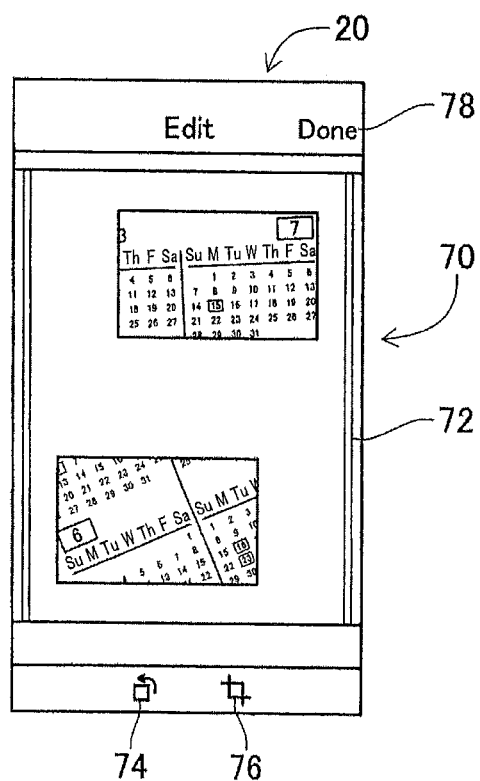
FIG. 19 is a view illustrating the edit screen.

In the case where the user wants to rotate an upper one of the two partial images displayed on the display area 82, the user performs the above-described operations to rotate only the upper partial image by a desired angle. When the Done button 90 is operated on the rotation processing screen 80 after the user performs the operation for rotating the desired one of the two partial images displayed on the display area 82, as illustrated in FIG. 19, the LCD 20 displays the edit screen 70 containing the two cropped images rotated individually. As described above, the mobile phone 10 can rotate each of a plurality of cropped images individually by a desired angle, resulting in high operability.

Display Application

Figure 20:
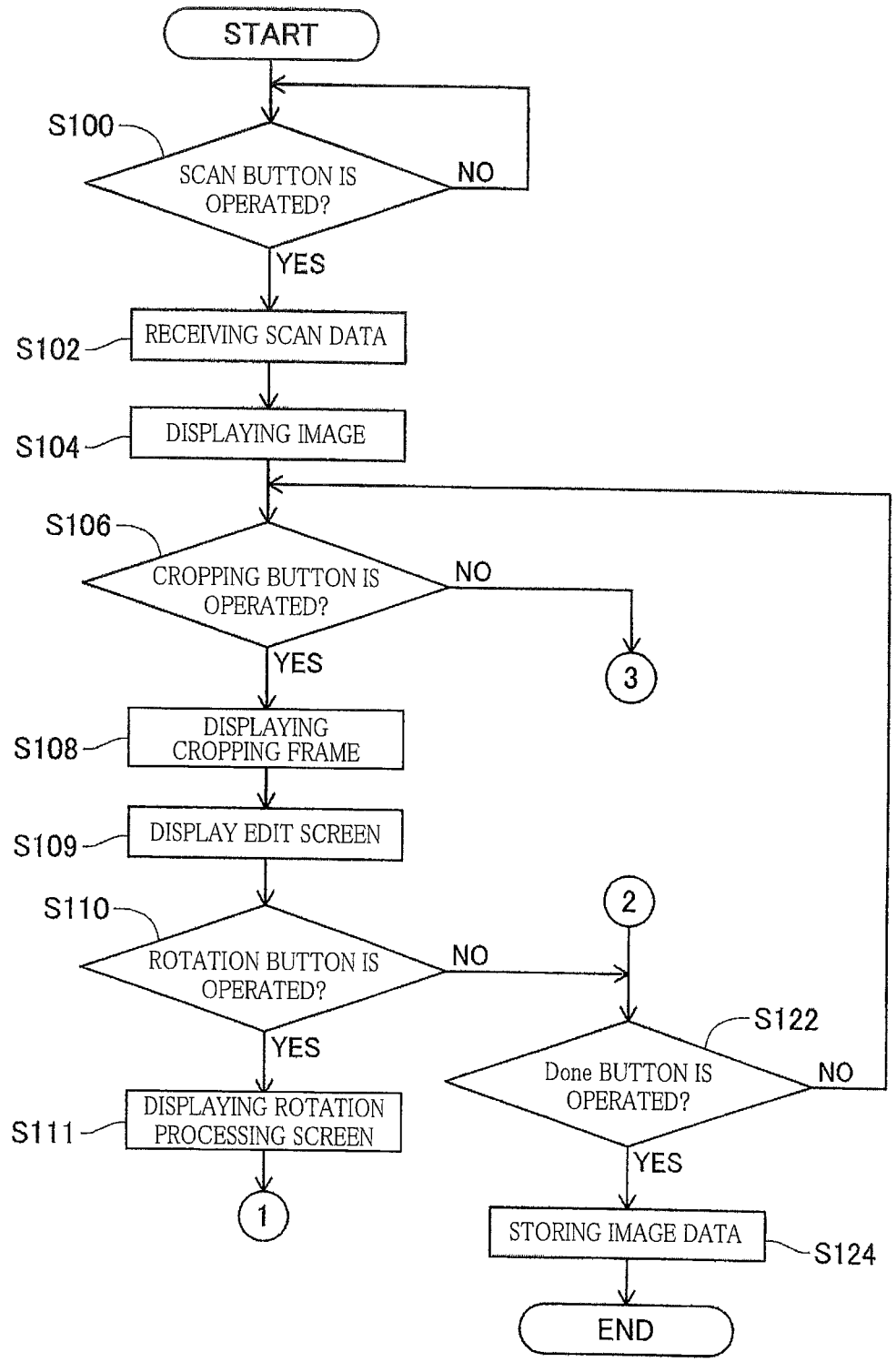
FIG. 20 is a flow chart illustrating processings according to a display application.
Figure 21:
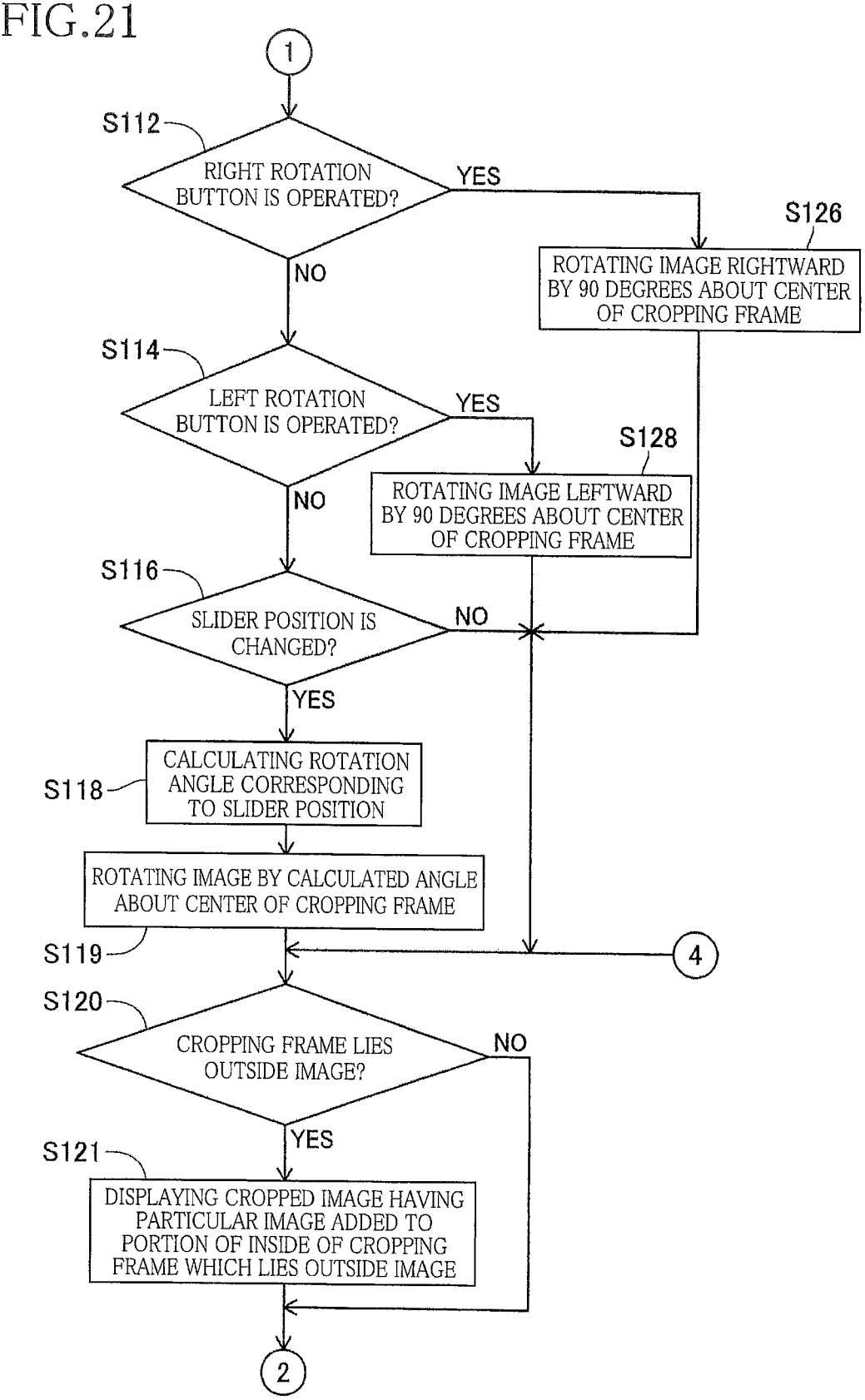
FIG. 21 is a flow chart illustrating processings according to the display application.
Figure 22:
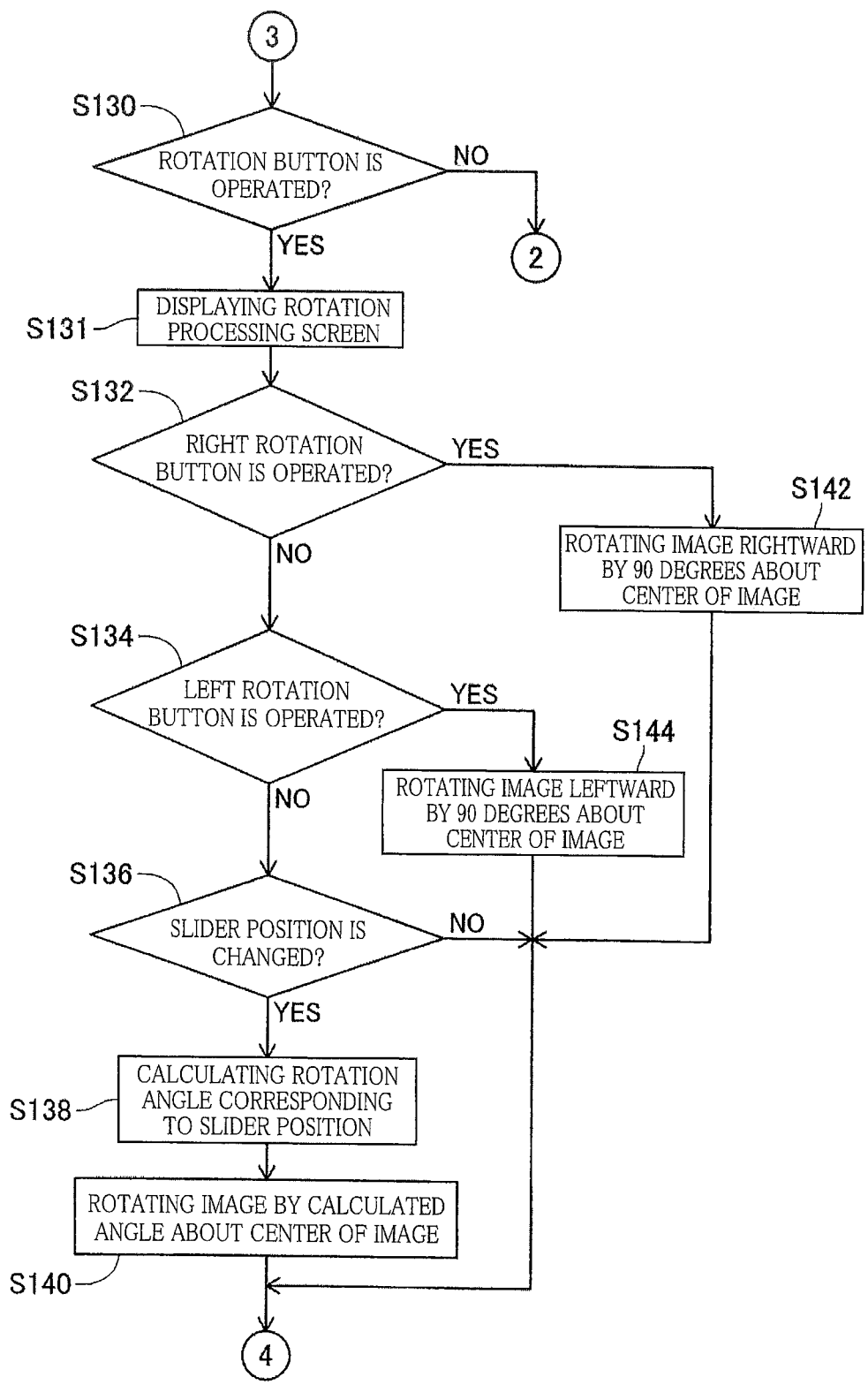
FIG. 22 is a flow chart illustrating processings according to the display application.

The CPU 12 executes the display application 36 to display an image on the LCD 20 based on the scan data and rotate the displayed image, for example. There will be next explained processings executed in the display application 36 executed by the CPU 12 with reference to FIGS. 20 through 22.

When the display application 36 is executed, the flow begins with S100 at which the CPU 12 determines whether the scan button is operated or not. When the scan button is not operated (S100: NO), the CPU 12 repeats the processing at S100. When the scan button is operated (S100: YES), the CPU 12 at S102 receives scan data transmitted from the scanner 50. An image based on the received scan data is at S104 displayed on the display area 72 of the edit screen 70.

When the image is displayed on the display area 72 of the edit screen 70, the CPU 12 at S106 determines whether the cropping button 76 is operated or not. When the cropping button 76 is operated (S106: YES), the CPU 12 at S108 controls the LCD 20 to display the cropping processing screen 100 containing the image and the cropping frame 104 displayed on the display area 102 of the cropping processing screen 100. It is noted that when the cropping button 76 is operated in a state in which the cropping frame 120 has already been displayed on the display area 72 of the edit screen 70 (S106: YES), the image, the cropping frame 120, and the cropping frame 104 are at S108 displayed on the display area 102 of the cropping processing screen 100.

When the Done button 106 is operated on the cropping processing screen 100, the CPU 12 at S109 controls the LCD 20 to display the edit screen 70. On this edit screen 70, a portion of the image which is located inside the cropping frame 104 is displayed as the cropped image. In the case where not only the cropping frame 104 but also the cropping frame 120 is displayed on the display area 102 of the cropping processing screen 100, the image inside the cropping frame 104 and the image inside the cropping frame 120 are displayed as the cropped images. That is, a plurality of cropped images are displayed. At S110, the CPU 12 determines whether the rotation button 74 is operated on the edit screen 70 or not.

When the rotation button 74 is operated on the edit screen 70 (S110: YES), the CPU 12 at S111 controls the LCD 20 to display the rotation processing screen 80. On this rotation processing screen 80, not only the cropped image but also an image outside the cropped image is displayed. In the case where a plurality of cropped images are displayed on the edit screen 70, the plurality of cropped images and an image outside the plurality of cropped images are displayed on the rotation processing screen 80, and this image outside the plurality of cropped images is displayed so as to be divided into a plurality of partial images containing the respective cropped images.

At S112, the CPU 12 determines whether the right rotation button 86 is operated on the rotation processing screen 80 or not. When the right rotation button 86 is not operated (S112: NO), the CPU 12 at S114 determines whether the left rotation button 84 is operated on the rotation processing screen 80 or not. When the left rotation button 84 is not operated (S114: NO), the CPU 12 at S116 determines whether a position of the slider 98 of the angle adjuster 88 is changed or not.

When the position of the slider 98 is changed (S116: YES), the CPU 12 at S118 calculates an angle of rotation of the image which corresponds to the position of the slider 98. The CPU 12 at S119 rotates the image displayed on the display area 82 of the rotation processing screen 80, by the calculated angle, about the center 121 of the cropping frame 120. It is noted that in the case where the displayed image is divided into a plurality of partial images on the rotation processing screen 80, a selected one of the plurality of partial images is at S119 rotated by the calculated angle about the center 121 of the cropping frame 120 contained in the partial image.

At S120, the CPU 12 determines whether a portion of the cropping frame 120 lies off the image or not. When the cropping frame 120 lies off the rotated image (S120: YES), the CPU 12 at S121 creates image data in which the particular image is added to a portion of the inside of the cropping frame 120 which lies off the image, and the CPU 12 displays a cropped image based on the created image data, and this flow goes to S122. When the cropping frame 120 does not lie off the rotated image (S120: NO), this flow goes to S122 without going to S121.

At S122, the CPU 12 determines whether or not the Done button 78 displayed on the edit screen 70 is operated after the Done button 90 is operated on the rotation processing screen 80, and the edit screen 70 is displayed on the LCD 20. When the Done button 78 is not operated (S122: NO), this flow returns to S106. When the Done button 78 is operated (S122: YES), the CPU 12 at S124 stores, into the data storage area 38, image data indicating the image displayed on the display area 72 of the edit screen 70, and this flow ends.

When the CPU 12 at S112 determines that the right rotation button 86 is operated (S112: YES), the CPU 12 at S126 rotates the image displayed on the display area 82 of the rotation processing screen 80, in the right direction by 90 degrees about the center 121 of the cropping frame 120. It is noted that in the case where the displayed image is divided into a plurality of partial images on the rotation processing screen 80, a selected one of the plurality of partial images is at S126 rotated in the right direction by 90 degrees about the center 121 of the cropping frame 120 contained in the partial image. The CPU 12 thereafter executes the processings at S120 and subsequent steps. When the CPU 12 at S114 determines that the left rotation button 84 is operated (S114: YES), the CPU 12 at S128 rotates the image displayed on the display area 82 of the rotation processing screen 80, in the left direction by 90 degrees about the center 121 of the cropping frame 120. It is noted that in the case where the displayed image is divided into a plurality of partial images on the rotation processing screen 80, a selected one of the plurality of partial images is at S128 rotated in the left direction by 90 degrees about the center 121 of the cropping frame 120 contained in the partial image. The CPU 12 thereafter executes the processings at S120 and subsequent steps.

Also when the CPU 12 at S116 determines that the position of the slider 98 is not changed (S116: NO), the CPU 12 executes the processings at S120 and subsequent steps. When the CPU 12 at S110 determines that the rotation button 74 displayed on the edit screen 70 is not operated (S110: NO), this flow goes to S122.

When the CPU 12 at S106 determines that the cropping button 76 is not operated (S106: NO), the CPU 12 at S130 determines whether the rotation button 74 is operated on the edit screen 70 or not. When the rotation button 74 is operated (S130: YES), the CPU 12 at S131 controls the LCD 20 to display the rotation processing screen 80. The CPU 12 at S132 determines whether the right rotation button 86 is operated on the rotation processing screen 80 or not. When the right rotation button 86 is not operated (S132: NO), the CPU 12 at S134 determines whether the left rotation button 84 is operated on the rotation processing screen 80 or not. When the left rotation button 84 is not operated (S134: NO), the CPU 12 at S136 determines whether the position of the slider 98 of the angle adjuster 88 is changed or not.

When the position of the slider 98 is changed (S136: YES), the CPU at S138 calculates an angle of rotation of the image which corresponds to the position of the slider 98. The CPU 12 at S140 rotates the image displayed on the display area 82 of the rotation processing screen 80, by the calculated angle about the center 92 of the image. The CPU 12 then executes the processings at S120 and subsequent steps.

When the CPU 12 at S132 determines that the right rotation button 86 is operated (S132: YES), the CPU 12 at S142 rotates the image displayed on the display area 82 of the rotation processing screen 80, in the right direction by 90 degrees about the center 92 of the image. The CPU 12 then executes the processings at S120 and subsequent steps. When the CPU 12 at S134 determines that the left rotation button 84 is operated (S134: YES), the CPU 12 at S144 rotates the image displayed on the display area 82 of the rotation processing screen 80, in the left direction by 90 degrees about the center 92 of the image. The CPU 12 then executes the processings at S120 and subsequent steps. Also when the CPU 12 at S136 determines that the position of the slider 98 is not changed (S136: NO), the CPU 12 executes the processings at S120 and subsequent steps.

Second Embodiment

Figure 23:
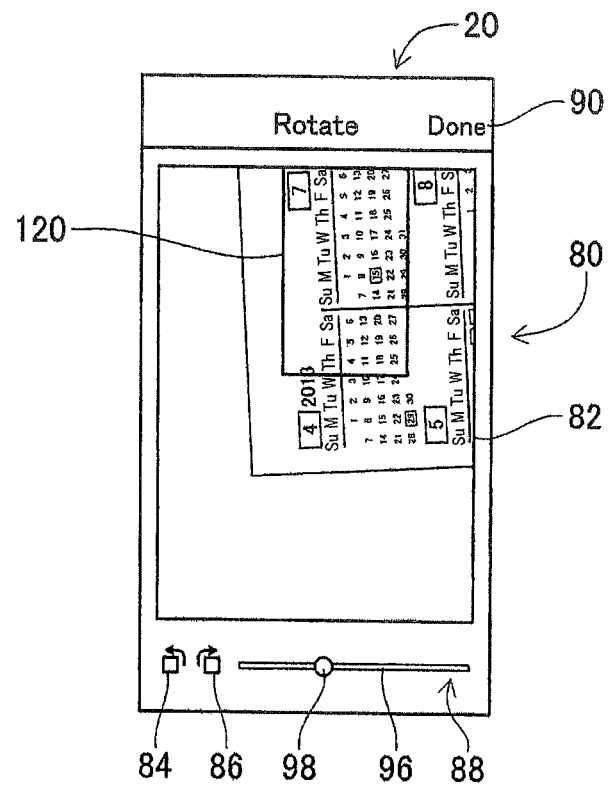
FIG. 23 is a view illustrating the rotation processing screen.
Figure 24:
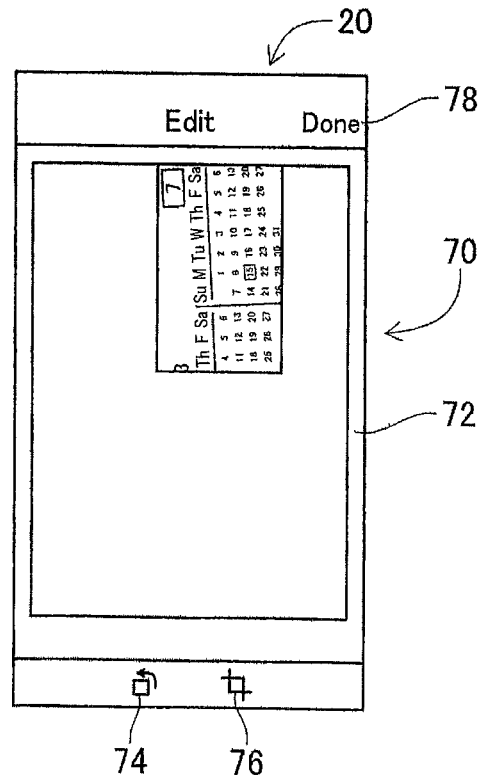
FIG. 24 is a view illustrating the edit screen.

There will be next explained a second embodiment. It is noted that the same reference numerals as used in the first embodiment are used to designate the corresponding elements of the second embodiment, and an explanation of which is dispensed with. As illustrated in FIG. 23, when the left rotation button 84 is operated in the state in which the cropping frame 120 is displayed on the display area 82 of the rotation processing screen 80, both of the image displayed on the display area 82 and the cropping frame 120 are rotated in the left direction by 90 degrees. It is noted that in the case where the cropping frame 120 is displayed on the display area 82, the image and the cropping frame 120 are rotated not about the center of the display area 82 but about the center of the cropping frame 120. When the Done button 90 is operated after the image and the cropping frame 120 are rotated, as illustrated in FIG. 24, only the image inside the cropping frame 120 rotated in the left direction by 90 degrees is displayed on the display area 82 as the cropped image. It is noted that when the right rotation button 86 is operated in the state in which the cropping frame 120 is displayed on the display area 82, the same processing is executed as in the case where the left rotation button 84 is operated, except for both of the image and the cropping frame 120 being rotated in the right direction, and an explanation thereof is dispensed with.

When the slider 98 of the angle adjuster 88 is slid by the user in the state in which the cropping frame 120 is displayed on the display area 82 of the rotation processing screen 80, the image displayed on the display area 82 is rotated in the direction of the sliding of the slider 98 by the angle corresponding to the amount of the sliding of the slider 98. In this rotation, the cropping frame 120 is not rotated. That is, when the slider 98 is slid in the state in which the cropping frame 120 is displayed on the display area 82, only the image displayed on the display area 82 is rotated in response to the sliding operation of the user.

Figure 25:
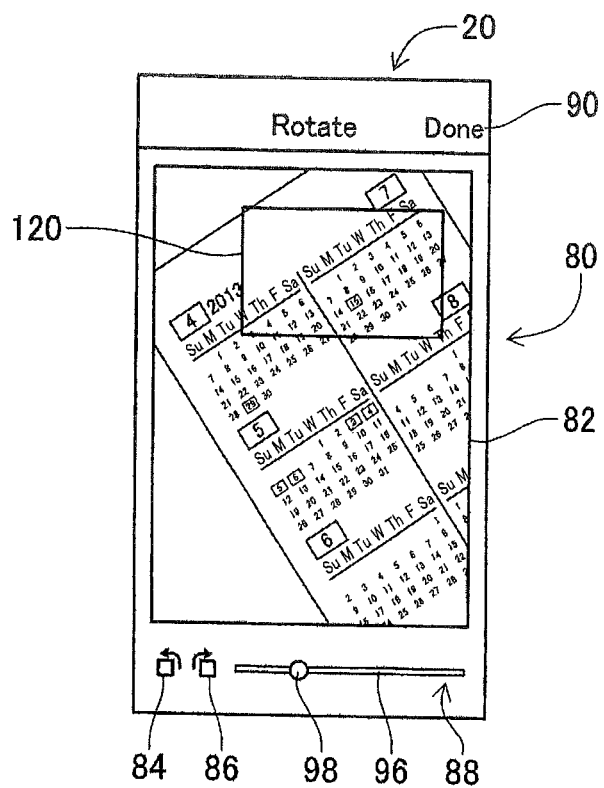
FIG. 25 is a view illustrating the rotation processing screen.
Figure 26:
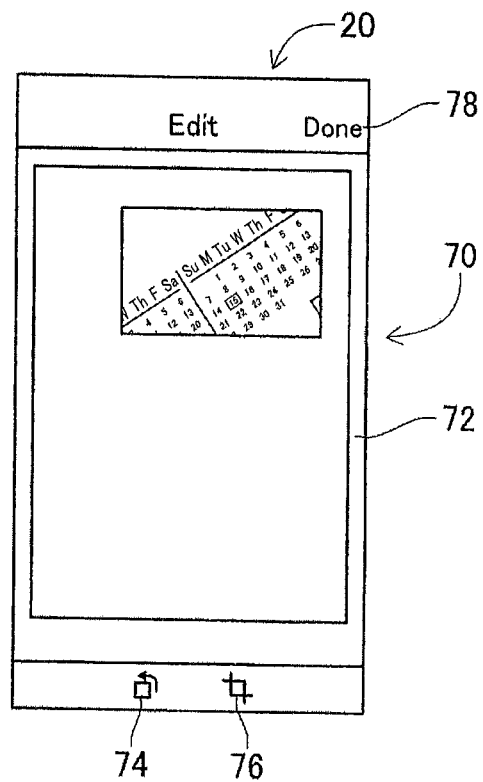
FIG. 26 is a view illustrating the edit screen.

Specifically, as illustrated in FIG. 25, in the case where the slider 98 is slid by the user in the left direction by a certain amount, for example, only the image displayed on the display area 82 is rotated in the left direction by the angle corresponding to the amount of the sliding of the slider 98 without rotation of the cropping frame 120. It is noted that in the case where the cropping frame 120 is displayed on the display area 82, the image is rotated not about the display area 82 but about the center of the cropping frame 120. When the Done button 90 is operated after the rotation of the image, as illustrated in FIG. 26, only the image inside the cropping frame 120 not rotated is displayed on the display area 82 as the cropped image.

When the slider 98 is slid in the right direction by a certain amount in the state in which the cropping frame 120 is displayed on the display area 82, the same processing is executed as in the case where the slider 98 is slid in the left direction by a certain amount, except for the image displayed on the display area 82 being rotated in the right direction, and an explanation thereof is dispensed with. It is noted that the maximum rotation angle by which the cropped image is rotated by the operation for the slider 98 is set at an angle equal to the image maximum rotation angle, and like the image maximum rotation angle, the maximum rotation angle for the cropped image varies depending upon a position of a placed document on the flat bed or the ADF, based on which the displayed image is created.

As described above, when the cropped image is rotated by the operation for the left rotation button 84 or the right rotation button 86, the CPU 12 rotates not only the image but also the cropping frame 120. With this processing, the cropped image in a sideways position or the cropped image flipped in the up and down direction can be displayed on the LCD 20 in a normal state. In the case where the cropped image is rotated by the operation for the angle adjuster 88, only the image is rotated without rotation of the cropping frame 120. This processing allows the user to slightly adjust only the angle of the displayed image without changing the position of the cropped image.

When the cropped image is rotated, not only the image inside the cropping frame 120, i.e., the cropped image, but also the image outside the cropping frame 120 is displayed. This processing allows the user to rotate the cropped image while viewing the entire image, thereby appropriately rotating the cropped image.

Display Application

Figure 27:
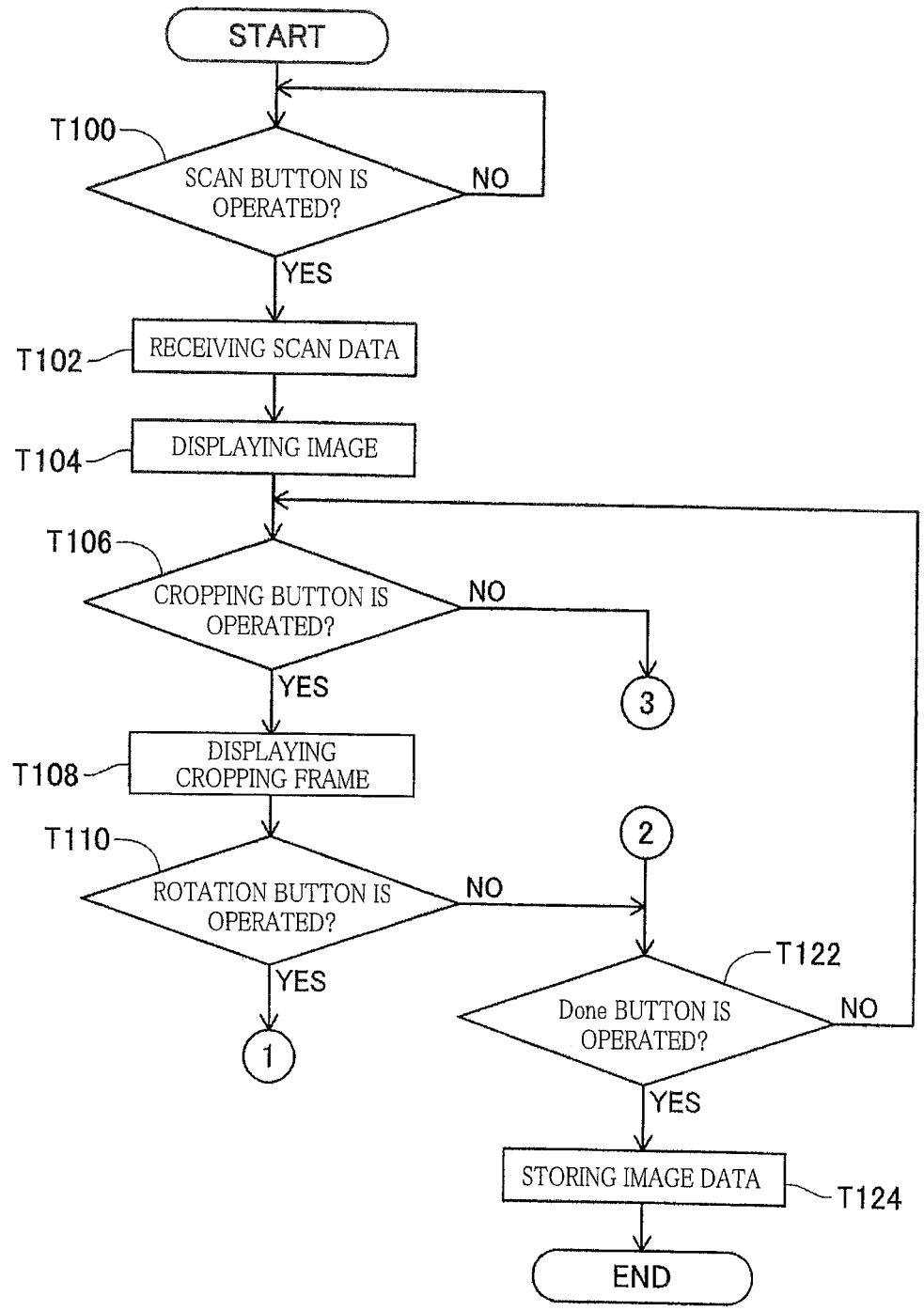
FIG. 27 is a flow chart illustrating processings according to the display application.
Figure 28:
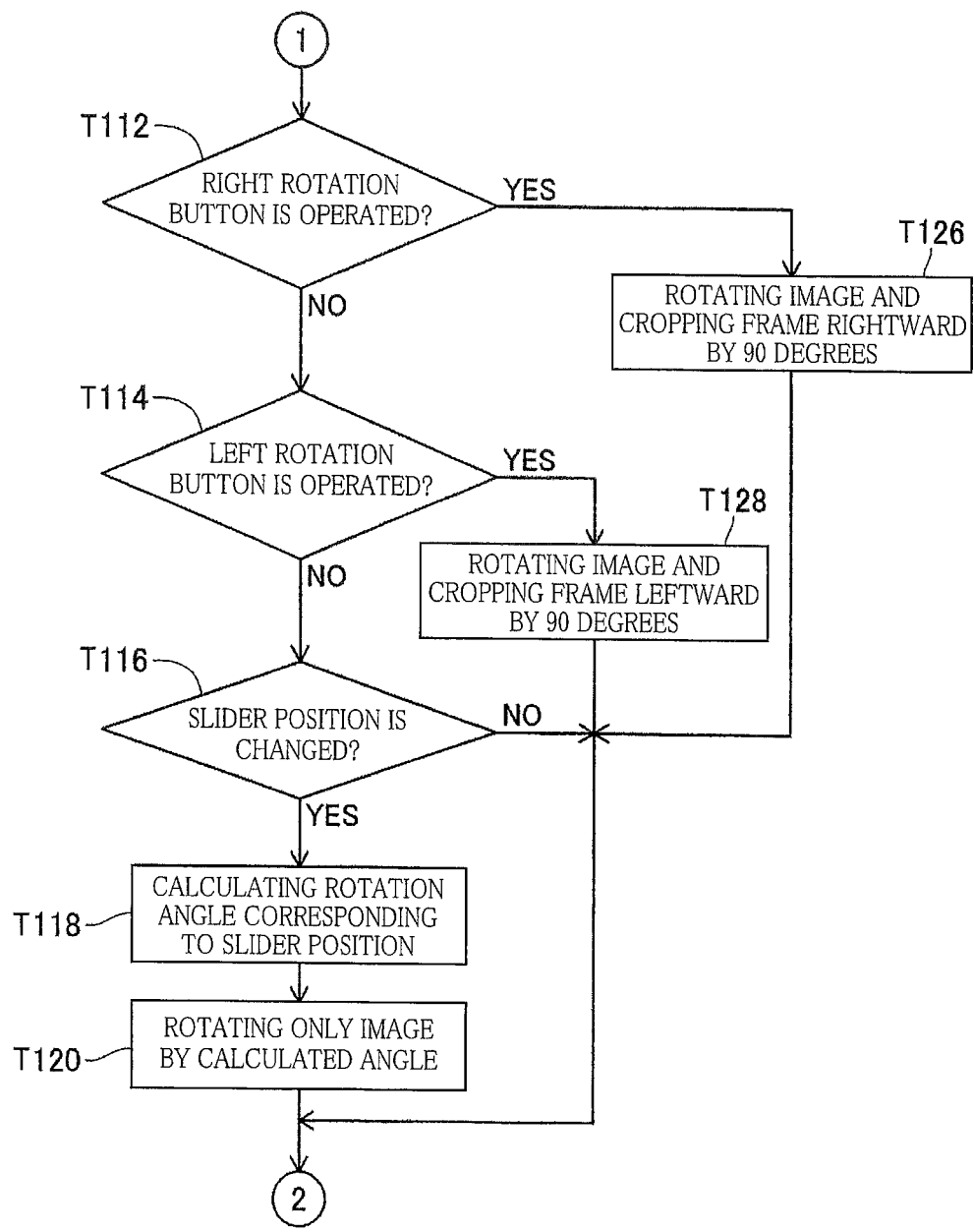
FIG. 28 is a flow chart illustrating processings according to the display application.
Figure 29:
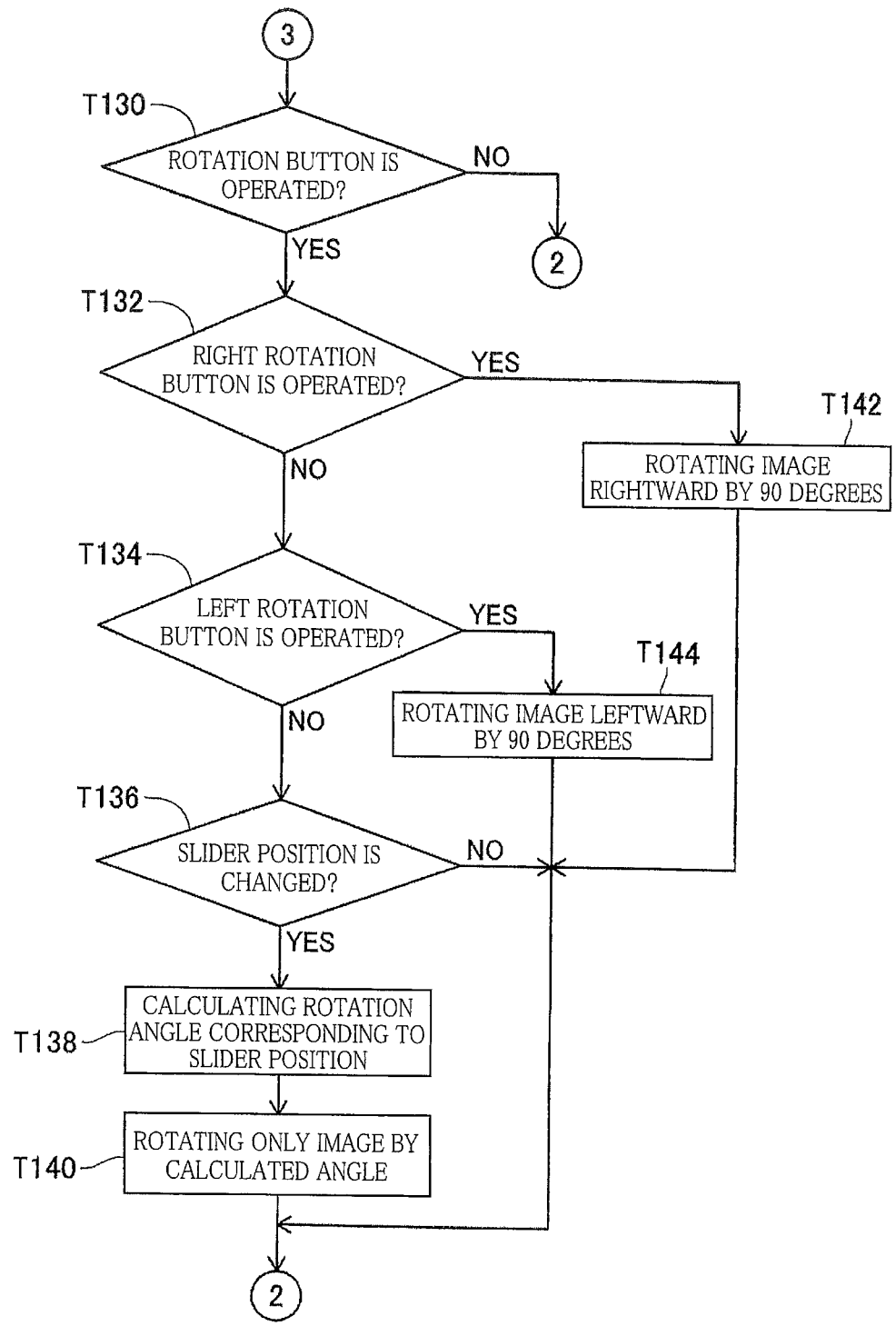
FIG. 29 is a flow chart illustrating processings according to the display application.

The CPU 12 executes the display application 36 to display an image on the LCD 20 based on the scan data and rotate the displayed image, for example. There will be next explained processings executed in the display application 36 executed by the CPU 12 with reference to FIGS. 27 through 29.

When the display application 36 is executed, the flow begins with T100 at which the CPU 12 determines whether the scan button is operated or not. When the scan button is not operated (T100: NO), the CPU 12 repeats the processing at T100. When the scan button is operated (T100: YES), the CPU 12 at T102 receives scan data transmitted from the scanner 50. An image based on the received scan data is at T104 displayed on the display area 72 of the edit screen 70.

When the image is displayed on the display area 72 of the edit screen 70, the CPU 12 at T106 determines whether the cropping button 76 is operated or not. When the cropping button 76 is operated (T106: YES), the CPU 12 at T108 controls the LCD 20 to display the cropping processing screen 100 containing the image and the cropping frame 104 displayed on the display area 102 of the cropping processing screen 100. The CPU 12 at T110 determines whether or not the rotation button 74 is operated on the edit screen 70 after the edit screen 70 is displayed on the LCD 20 in response to the operation for the Done button 106 displayed on the cropping processing screen 100.

When the rotation button 74 is operated on the edit screen 70 (T110: YES), the CPU 12 controls the LCD 20 to display the rotation processing screen 80 and at T112 determines whether the right rotation button 86 is operated on the rotation processing screen 80 or not. When the right rotation button 86 is not operated (T112: NO), the CPU 12 at T114 determines whether the left rotation button 84 is operated on the rotation processing screen 80 or not. When the left rotation button 84 is not operated (T114: NO), the CPU 12 at T116 determines whether the position of the slider 98 of the angle adjuster 88 is changed or not.

When the position of the slider 98 is changed (T116: YES), the CPU 12 at T118 calculates an angle of rotation of the image which corresponds to the position of the slider 98. The CPU 12 at T120 rotates only the image by the calculated angle without rotating the cropping frame 120 displayed on the display area 82 of the rotation processing screen 80. At T122, the CPU 12 determines whether or not the Done button 78 displayed on the edit screen 70 is operated after the Done button 90 is operated on the rotation processing screen 80, and the edit screen 70 is displayed on the LCD 20. When the Done button 78 is not operated (T122: NO), this flow returns to T106. When the Done button 78 is operated (T122: YES), the CPU 12 at T124 stores, into the data storage area 38, image data indicating the image displayed on the display area 72 of the edit screen 70, and this flow ends.

When the CPU 12 at T112 determines that the right rotation button 86 is operated (T112: YES), the CPU 12 at T126 rotates both of the image and the cropping frame 120 displayed on the display area 82 of the rotation processing screen 80, in the right direction by 90 degrees, and this flow goes to T122. When the CPU 12 at T114 determines that the left rotation button 84 is operated (T114: YES), the CPU 12 at T128 rotates both of the image and the cropping frame 120 displayed on the display area 82 of the rotation processing screen 80, in the left direction by 90 degrees, and this flow goes to T122.

Also when the CPU 12 at T116 determines that the position of the slider 98 is not changed (T116: NO), this flow goes to T122. When the CPU 12 at T110 determines that the rotation button 74 displayed on the edit screen 70 is not operated (T110: NO), this flow goes to T122.

When the CPU 12 at T106 determines that the cropping button 76 is not operated (T106: NO), the CPU 12 at T130 determines whether the rotation button 74 is operated on the edit screen 70 or not. When the rotation button 74 is operated (T130: YES), the CPU 12 controls the LCD 20 to display the rotation processing screen 80. The CPU 12 at T132 determines whether the right rotation button 86 is operated on the rotation processing screen 80 or not. When the right rotation button 86 is not operated (T132: NO), the CPU 12 at T134 determines whether the left rotation button 84 is operated on the rotation processing screen 80 or not. When the left rotation button 84 is not operated (T134: NO), the CPU 12 at T136 determines whether the position of the slider 98 of the angle adjuster 88 is changed or not.

When the position of the slider 98 is changed (T136: YES), the CPU at T138 calculates an angle of rotation of the image which corresponds to the position of the slider 98. The CPU 12 at T140 rotates the image displayed on the display area 82 of the rotation processing screen 80, by the calculated angle, and this flow goes to T122.

When the CPU 12 at T132 determines that the right rotation button 86 is operated (T132: YES), the CPU 12 at T142 rotates the image displayed on the display area 82 of the rotation processing screen 80, in the right direction by 90 degrees, and this flow goes to T122. When the CPU 12 at T134 determines that the left rotation button 84 is operated (T134: YES), the CPU 12 at T144 rotates the image displayed on the display area 82 of the rotation processing screen 80, in the left direction by 90 degrees, and this flow goes to T122. Also when the CPU 12 at T136 determines that the position of the slider 98 is not changed (T136: NO), this flow goes to T122.

It is noted that the processing at S104 is one example of a first display process. The processing at S108 is one example of a second display process. The processing at S120 is one example of a determination process. The processing at S121 is one example of a third display process. The processings at S119, S126, and S128 are one example of a first image rotation process. The processings at S140, S142, and S144 are one example of a second image rotation process.

It is noted that the processings at T104 and T108 are one example of a display process. The processings at T126, T128, T142, and T144 are one example of a first-angle rotation process. The processings at T120 and T140 are one example of a second-angle rotation process.

It is to be understood that the disclosure is not limited to the details of the illustrated embodiments, but may be embodied with various changes and modifications, which may occur to those skilled in the art, without departing from the spirit and scope of the disclosure. Specifically, for example, the left rotation button 84, the right rotation button 86, and the angle adjuster 88 for rotating the image are touch buttons displayed on the LCD 20 in the above-described embodiment but may be mechanical buttons.

While the user directly operates the slider 98 of the angle adjuster 88 with the input object to slide the slider 98 in the above-described embodiments, a button or the like different from the slider 98 may be displayed so as to allow the user to operate the button with the input object to slide the slider 98. Also, the mobile phone 10 may be configured such that the user inputs a number to rotate the image by an angle corresponding to the input number, without using the angle adjuster 88.

In the above-described embodiments, the maximum rotation angle for rotation of the image by the operation for the angle adjuster 88 is set at 10 or 15 degrees. However, the maximum rotation angle may be any angle as long as the angle is less than the angle by which the image is rotated by the operation for the left rotation button 84 or the right rotation button 86.

While the image is rotated by 90 degrees by each operation for the left rotation button 84 or the right rotation button 86 in the above-described embodiments, the image may be rotated by an angle different from 90 degrees. Since the image is often rotated by 90 or 180 degrees, the angle is preferably a submultiple of 90 degrees, such as 30 or 45 degrees.

In the above-described embodiments, the maximum rotation angle for rotation of the image by the operation for the angle adjuster 88 varies depending upon a position of a placed document based on which the image displayed on the LCD 20 is created. However, the maximum rotation angle may vary depending upon another scan processing condition instead of the position of the placed document. Also, the maximum rotation angle for rotation of the image by the operation for the angle adjuster 88 may not vary depending upon the scan processing condition. That is, the maximum rotation angle for rotation of the image by the operation for the angle adjuster 88 may be set at the same angle regardless of the scan processing condition for the document based on which the image to be displayed on the LCD 20 is created.

In the above-described embodiments, the image is displayed on the LCD 20 of the mobile phone 10 based on the scan data, and processings such as the rotation processing are executed for the image. However, the mobile phone 10 may be configured such that the LCD 20 displays an image based on image data different from the scan data, such as data created by image taking devices, e.g., cameras, and the processings are executed for the image.

While the mobile phone 10 is employed as a device for displaying the image and rotating the image in the above-described embodiments, any other devices including a display device such as the LCD 20 may be employed. Examples of such devices include: mobile terminals such as tablet devices; and stationary information processing devices such as a personal computer.

In the above-described embodiments, the processings illustrated in FIGS. 20-22 and 27-29 are executed by the CPU 12. These processings need not be executed by the CPU 12 and may be executed by an ASIC or another or other similar logical integrated circuits and may be executed by cooperation of the CPU, the ASIC, and the logical integrated circuit, for example.

What is claimed is:

1. A non-transitory storage medium storing a plurality of instructions executable by a processor of an information processing device, the information processing device comprising an operation device configured to accept a user operation and a display, the plurality of instructions, when executed by the processor, causing the information processing device to perform:
displaying, on the display, a first image, a cropping frame for cropping the first image, a first operation element, and a second operation element different from the first operation element in a display process;
rotating both of the first image and the cropping frame by a first rotation angle in a first-angle rotation process when the operation device accepts the user operation for the first operation element; and
rotating the first image by a second rotation angle without rotating the cropping frame in a second-angle rotation process when the operation device accepts the user operation for the second operation element, the second rotation angle being a rotation angle corresponding to an operation amount for the second operation element, wherein, when executed by the processor, the plurality of instructions cause the information processing device to perform, in the second-angle rotation process:
displaying both of a part of the first image positioned inside of the cropping frame and a part of the first image positioned outside of the cropping frame in the middle of rotation of the first image on the display, and
after a completion of the rotation of the first image, displaying the part of the first image positioned inside of the cropping frame without displaying the part of the first image positioned outside of the cropping frame on the display.

2. The non-transitory storage medium according to claim 1,
wherein a maximum angle of the second rotation angle corresponding to the operation amount in the second-angle rotation process is equal to or less than the first rotation angle in the first angle-rotation process.

3. The non-transitory storage medium according to claim 1,
wherein the second operation element comprises a slider movable on the display in a first direction, and
wherein, when executed by the processor, the plurality of instructions cause the information processing device to rotate the first image by the second rotation angle without rotating the cropping frame in the second-angle rotation process, when the operation device accepts the user operation for the slider, the second rotation angle being a rotation angle corresponding to an operation amount for the slider.

4. The non-transitory storage medium according to claim 1,
wherein a position of a rotation center of the first image coincides with a position of a rotation center of the cropping frame in the first-angle rotation process.

5. The non-transitory storage medium according to claim 1,
wherein, when executed by the processor, the plurality of instructions cause the information processing device to rotate both of the first image and the cropping frame about a center of the cropping frame in the first-angle rotation process, when the operation device accepts the user operation for the first operation element.

6. The non-transitory storage medium according to claim 1,
wherein a position of a rotation center of the first image is-coincides with a position of a center of the cropping frame in the second-angle rotation process.

7. The non-transitory storage medium according to claim 1,
wherein, when executed by the processor, the plurality of instructions cause the information processing device to rotate the first image about a center of the cropping frame without rotating the cropping frame in the second-angle rotation process, when the operation device accepts the user operation for the second operation element.

8. The non-transitory storage medium according to claim 1,
wherein, when executed by the processor, the plurality of instructions cause the information processing device to rotate both of the first image and the cropping frame without enlarging the first image and the cropping frame during the rotation thereof in the first-angle rotation process.

9. The non-transitory storage medium according to claim 1,
wherein, when executed by the processor, the plurality of instructions cause the information processing device to rotate both of the first image and the cropping frame without reducing the first image and the cropping frame during the rotation thereof in the first-angle rotation process.

10. The non-transitory storage medium according to claim 1,
wherein, when executed by the processor, the plurality of instructions cause the information processing device to rotate the first image without enlarging the first image during the rotation thereof in the second-angle rotation process.

11. The non-transitory storage medium according to claim 1,
wherein, when executed by the processor, the plurality of instructions cause the information processing device to rotate the first image without reducing the first image during the rotation thereof in the second-angle rotation process.

12. An information processing device, comprising:
an operation device configured to accept a user operation;
a display; and
a controller configured to execute:
displaying a first image based on image data, a cropping frame for cropping the first image, a first operation element, and a second operation element different from the first operation element, on the display in a display process;
rotating both of the first image and the cropping frame by a first rotation angle in a first-angle rotation process when the operation device accepts the user operation for the first operation element; and
rotating the first image by a second rotation angle without rotating the cropping frame in a second-angle rotation process, when the operation device accepts the user operation for the second operation element, the second rotation angle being a rotation angle corresponding to an operation amount for the second operation element,
wherein, in the second-angle rotation process, the controller is configured to execute:
displaying both of a part of the first image positioned inside of the cropping frame and a part of the first image positioned outside of the cropping frame in the middle of rotation of the first image on the display, and
after a completion of the rotation of the first image, displaying the part of the first image positioned inside of the cropping frame without displaying the part of the first image positioned outside of the cropping frame on the display.

13. The information processing device according to claim 12,
wherein a maximum angle of the second rotation angle corresponding to the operation amount in the second-angle rotation process is equal to or less than the first rotation angle in the first angle-rotation process.

14. The information processing device according to claim 12,
wherein the second operation element comprises a slider movable on the display in a first direction, and
wherein the controller is configured to rotate the first image by the second rotation angle without rotating the cropping frame in the second-angle rotation process, when the operation device accepts the user operation for the slider, the second rotation angle being a rotation angle corresponding to an operation amount for the slider.

15. The information processing device according to claim 12,
wherein a position of a rotation center of the first image coincides with a position of a rotation center of the cropping frame in the first-angle rotation process.

16. The information processing device according to claim 12,
wherein the controller is configured to rotate both of the first image and the cropping frame about a center of the cropping frame in the first-angle rotation process, when the operation device accepts the user operation for the first operation element.

17. The information processing device according to claim 12,
wherein a position of a rotation center of the first image coincides with a position of a center of the cropping frame in the second-angle rotation process.

18. The information processing device according to claim 12,
wherein the controller is configured to rotate the first image about a center of the cropping frame without rotating the cropping frame in the second-angle rotation process, when the operation device accepts the user operation for the second operation element.

19. The information processing device according to claim 12,
wherein the controller is configured to rotate both of the first image and the cropping frame without enlarging the first image and the cropping frame during the rotation thereof in the first-angle rotation process.

20. The information processing device according to claim 12,
wherein the controller is configured to rotate both of the first image and the cropping frame without reducing the first image and the cropping frame during the rotation thereof in the first-angle rotation process.

21. The information processing device according to claim 12,
wherein the controller is configured to rotate the first image without enlarging the first image during the rotation thereof in the second-angle rotation process.

22. The information processing device according to claim 12,
wherein the controller is configured to rotate the first image without reducing the first image during the rotation thereof in the second-angle rotation process.

23. A non-transitory storage medium storing a plurality of instructions executable by a processor of an information processing device, the information processing device comprising an operation device configured to accept a user operation and a display,
the plurality of instructions, when executed by the processor, causing the information processing device to perform:
displaying, on the display, a first image, a cropping frame for cropping the first image, a first operation element, and a second operation element different from the first operation element in a display process;
changing orientations of both of the first image and the cropping frame about a center of the cropping frame by a first amount in a first changing process when the operation device accepts the user operation for the first operation element; and
changing an orientation of the first image about the center of the cropping frame by a second amount without changing an orientation of the cropping frame in a second changing process when the operation device accepts the user operation for the second operation element, the second amount being an amount corresponding to an operation amount for the second operation element,
wherein, when executed by the processor, the plurality of instructions cause the information processing device to perform, in the second changing process:
displaying both of a part of the first image positioned inside of the cropping frame and a part of the first image positioned outside of the cropping frame in the middle of change of the orientation of the first image on the display, and
after a completion of the change of the orientation of the first image, displaying the part of the first image positioned inside of the cropping frame without displaying the part of the first image positioned outside of the cropping frame on the display.

24. An information processing device, comprising:
an operation device configured to accept a user operation;
a display; and
a controller configured to execute:
displaying a first image based on image data, a cropping frame for cropping the first image, a first operation element, and a second operation element different from the first operation element, on the display in a display process;
changing orientations of both of the first image and the cropping frame about a center of the cropping frame by a first amount in a first changing process when the operation device accepts the user operation for the first operation element; and
changing an orientation of the first image about the center of the cropping frame by a second amount without changing an orientation of the cropping frame in a second changing process when the operation device accepts the user operation for the second operation element, the second amount being an amount corresponding to an operation amount for the second operation element,
wherein, in the second changing process, the controller is configured to execute:
displaying both of a part of the first image positioned inside of the cropping frame and a part of the first image positioned outside of the cropping frame in the middle of change of the orientation of the first image on the display, and
after a completion of the change of the orientation of the first image, displaying the part of the first image positioned inside of the cropping frame without displaying the part of the first image positioned outside of the cropping frame on the display.

* * * * *